United States Patent [19]
Bolasna et al.

[11] Patent Number: 5,870,250
[45] Date of Patent: Feb. 9, 1999

[54] METHOD AND APPARATUS FOR IMPROVING FILE CAPACITY USING DIFFERENT FLYING HEIGHT PROFILES

[75] Inventors: Sanford A. Bolasna, San Jose; Jnaneshwar H. Nayak, Cupertino; Sridhar Gopalakrishna, Sunnydale, all of Calif.

[73] Assignee: International Business Machines Corporation, Armonk, N.Y.

[21] Appl. No.: 609,737

[22] Filed: Mar. 1, 1996

[51] Int. Cl.⁶ .................................. G11B 5/60; G11B 5/54
[52] U.S. Cl. ............................................. 360/103; 360/105
[58] Field of Search ....................................... 360/103, 105

[56] References Cited

U.S. PATENT DOCUMENTS

| | | | |
|---|---|---|---|
| 5,287,235 | 2/1994 | Cunningham et al. | 360/103 |
| 5,317,465 | 5/1994 | Chapin et al. | 360/103 |
| 5,550,692 | 8/1996 | Crane | 360/103 |

FOREIGN PATENT DOCUMENTS

| | | |
|---|---|---|
| 4-23284 | 5/1990 | Japan . |
| 3-125378 | 5/1991 | Japan . |
| 5-307749 | 11/1993 | Japan . |
| 93/09533 | 5/1993 | WIPO . |

*Primary Examiner*—William J. Klimowicz
*Attorney, Agent, or Firm*—Merchant, Gould, Smith, Edell, Welter & Schmidt, P.A.

[57] ABSTRACT

Air bearing sliders that achieve fly height profiles which allow improved areal density and file capacity. The sliders include angled features in such a way that they align with the air skew at textured zones on a disk. The angled features are selected to create a first air pressure distribution at first predetermined radii of the recording medium and a second air pressure distribution at second predetermined radii of the recording medium. The spacing profile may be obtained by skewing the whole or a portion of one or more rails with respect to the air bearing slider edges. In designs with a center rail, the spacing profile may be customized by skewing the center rail. Further optimization may be provided by altering the taper of the rail widths. Still further, the entire slider can be mounted with a skew with respect to the suspension to achieve the required fly height profile variations rather than skewing one or more of the rails. The exact shape of the profiles are optimized to the file's magnetic and mechanical needs and improve capacity and density in files that have constant texture (or no texture) throughout the whole disk surface.

124 Claims, 21 Drawing Sheets

METHOD AND APPARATUS FOR IMPROVING FILE CAPACITY USING DIFFERENT FLYING HEIGHT PROFILES

BACKGROUND OF THE INVENTION

1. Field of the Invention

This invention relates in general to air bearing sliders for use with recording media and more particularly, to a method and apparatus for improving file capacity using different flying height profiles.

2. Description of Related Art

Conventional magnetic disk drives are information storage devices which utilize at least one rotatable magnetic media disk with concentric data tracks, a read/write transducer for reading and writing data on the various tracks, an air bearing slider for holding the transducer adjacent to the track generally in a flying mode above the media, a suspension for resiliently holding the air bearing slider and the transducer over the data tracks, and a positioning actuator connected to the suspension for moving the transducer across the media to the desired data track and maintaining the transducer over the data track during a read or a write operation.

In magnetic recording technology, it is continually desired to improve the areal density at which information can be recorded and reliably read. Because the recording density of a magnetic disk drive is limited by the distance between the transducer and the magnetic media, a goal of air bearing slider design is to "fly" the air bearing slider as closely as possible to a magnetic medium while avoiding physical impact with the medium. Smaller spacings, or "fly heights", are desired so that the transducer can distinguish between the magnetic fields emanating from closely spaced regions on the disk.

Zone bit recording can provide significant performance and capacity improvements in magnetic disk storage files. In order to facilitate this technology, it is desirable to maintain a constant spacing between the read/write head and the disk across all the zones, from the ID radius to the OD radius of the disk. It is also desirable to fly as low as possible across the data zones to increase amplitude and resolution and further increase areal density and file capacity. However, low fly height causes concerns over mechanical reliability in the file, for both start/stop life and long term flyability.

Constant flying heights across the data zones presents a substantial challenge to slider design because the air velocity created by the rotating disk varies in both magnitude and direction relative to the air bearing slider at all radii. This is further exacerbated in rotary actuator files, since the air bearing slider skew angle also varies across the data zone from ID to OD.

An air bearing slider also experiences fly height variations due to roll. For an air bearing slider with zero skew relative to disk rotation, roll is a measure of the angle formed between the surface of the disk and a plane holding the longitudinal and latitudinal axes of the air bearing slider. Variations in roll occur when a resiliently mounted slider experiences a skewed air flow or the actuator experiences head to disk contact. Insensitivity to roll variations is a crucial requirement of air bearing sliders.

Variations in the crown of an air bearing slider can also lead to variations in fly height. Crown is a measure of the concave or convex bending of the air bearing slider along its longitudinal axis. Crown develops in sliders because of surface stresses that arise during the fabrication and suspension bonding processes. These stresses are not well controlled and therefore lead to sliders with relatively large variations in crown. Also, an individual slider can experience variations in its crown due to temperature variations that occur during the normal operation of a recording disk drive. For these reasons, it is important that the flying height of an air bearing slider not vary substantially as a result of variations in crown. Furthermore, an air bearing slider with a non-zero crown is the equivalent of a flat slider flying over a disk having small amplitude, long wavelength undulations. Therefore, since all disks have some degrees of waviness, an air bearing slider that is less sensitive to variations in crown is also less sensitive to imperfections in the flatness of the recording disk it is flying over.

Finally, an air bearing slider experiences varying conditions during the high speed radial movement of the actuator as it accesses data on various portions of the disk. High speed movement across the disk can lead to large values of slider roll and skew and a resultant variation in fly height. This is yet another reason that an air bearing slider must be insensitive to changes in roll and skew.

Typical taper-flat type sliders cannot satisfy the constant spacing requirements for zone-bit recording. For most rotary actuator configurations, the taper-flat slider flying height increases rapidly as the head is moved out from the ID. As it approaches the middle of the data band, it reaches a maximum spacing, which may be up to twice as large as the initial ID flying height. From there, the clearance drops as the air bearing slider moves toward the rim of the disk.

When any of the above described variations in fly height occur, they may result in contact between the air bearing slider and the rapidly rotating recording medium. Any such contact leads to wear of the air bearing slider and the recording surface and is potentially catastrophic. Prior art slider designs have attempted to avoid this problem by addressing one or more of the above described sensitivities, so as to produce an air bearing slider with uniform flying height under the varying conditions that may be experienced by the air bearing slider.

One example of an air bearing slider which is designed to be insensitive to roll, crown, and skew is disclosed in U.S. Pat. No. 5,396,386, issued to Bolasna et al., entitled "ROLL INSENSITIVE AIR BEARING SLIDER", and is incorporated by reference herein. The air bearing slider described by Bolasna et al. includes a pair of substantially co-planner side rails. A recess section is open at both the leading and trailing ends of the air bearing slider while each side rail has a tapered section or etched depth at the leading edge of the air bearing slider. One rail carries the transducer and it extends from the entire length of the air bearing slider body. The rail without a transducer extends from the leading edge towards the trailing edge, but does not extend all the way to the trailing edge. Under some skew, accessing, and head to disk contact conditions, resulting slider roll causes the flying height of the inactive rail to drop. By proper selection of the length and width of the inactive rail, the roll is biased such that the fly height of the inactive rail remains higher than that of the active rail even under worst case conditions. Therefore, minimum slider to disk spacing is larger than it would be for an air bearing slider design in which all rails extend the entire length of the air bearing slider.

Greater data densities require lower and lower flying heights which in turn demand smoother and smoother disks. However, increased disk smoothness results in increased head-disk stiction which can result in increasing the torque required to start the disk drive. In some disk drives, this problem is partially solved by texturing portions of the disk, for example the start-stop zone. The fly height of the magnetic head element is maintained fairly constant over the entire disk to maximize the storage capacity of the disk drive. With a flat fly height profile, the ability to reduce fly heights to increase storage capacity is severely limited by the texture on the disk due to interactions of the head with the disk texture.

For files that utilize zone texturing on the disk surface to improve stiction in the start-stop, the ID flying height has been dictated by the stiction performance in the textured zone. The slider must achieve lift quickly and obtain a fly height that is higher than is necessary over the smooth data zones. However, current air bearing designs to achieve a constant fly height profiles result in the air bearing sliders flying as high in the smooth data zone as they do in the roughened textured zone. A fly height with this characteristic degrades areal density and file capacity compared to what could be accomplished if the fly height over the textured zone did not have to be considered in the air bearing design.

Improvements in the capacity and areal density of files using zone textured disks may be realized by flying high in the textured zone to maintain adequate start/stop life and stiction performance, and then flying lower in the data zones where the disk is smoother and there is no mechanical need to fly as high as in the textured zone.

It can be seen then that there is a need for an air bearing slider that can fly high in textured zones and fly lower in the data zones.

It can also be seen that there is a need for a disk drive having a disk with texture zone that require high fly heights and untextured or non-textured zones that allow low fly heights to obtain design benefits.

It can also be seen that there is a need for a disk drive which results in considerable increase in file capacity without any undue increase in file stiction.

SUMMARY OF THE INVENTION

To overcome the limitations in the prior art described above, and to overcome other limitations that will become apparent upon reading and understanding the present specification, the present invention discloses a file configuration that improves areal density and file capacity for files using textured zone disks by requiring fly height profiles that fly lower in the data zone than in the textured zone. The exact shape of the profiles are optimized to the magnetic and mechanical needs of a particular file. Based upon the specifics of the file's magnetic and mechanical needs, such profiles also improve capacity and density in files that have constant texture (or no texture) throughout the whole disk surface.

The general characteristics of sliders that achieve the proposed profile include angling features of the air bearing slider (rails, tapers, etch pockets) in such a way that they align with the skew at the textured zone of the disk in a way that results in higher flying height. The effect of the angled features decreases at other skew angles at other disk radii and results in lower flying height.

A system in accordance with the principles of the present invention comprises a support structure and air bearing surfaces, disposed on the support structure and having angled features relative to a longitudinal axis of the support structure. The angled features are selected to take advantage of changes in the distribution of pressure across the surface to obtain the desired fly heights. Optimal benefits are reaped by angling geometry to lower the fly height of the air bearing surfaces at the middle diameters.

One aspect of the present invention is that, in negative pressure designs with a center rail, the spacing profile is customized by skewing the center rail.

Another aspect of the present invention is that the spacing profile may be obtained by skewing the whole or a portion of one or more rails of the air-bearing with respect to the air bearing slider edges, such that the axis of the disk velocity vector and the slider rail are proximate over the start-stop zone and results in maximum fly height over the start-stop zone and a lower fly height over the data zone.

Another aspect of the present invention is that the side rails may be skewed to achieve a larger difference between data zone and start-zone fly heights.

Yet another aspect of the present invention is that further optimization may be provided by tapering the rail widths.

Still another aspect of the present invention is that the entire slider can be mounted with a skew with respect to the suspension to achieve the required fly height profile variations between data zone and start-stop zones rather than or in addition to skewing one or more of the rails.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of exemplary embodiments, reference is made to the accompanying drawings which form a part hereof, and in which is shown by way of illustration specific embodiments in which the invention may be practiced. It is to be understood that other embodiments may be utilized as structural changes may be made without departing from the scope of the present invention.

Figure 1:
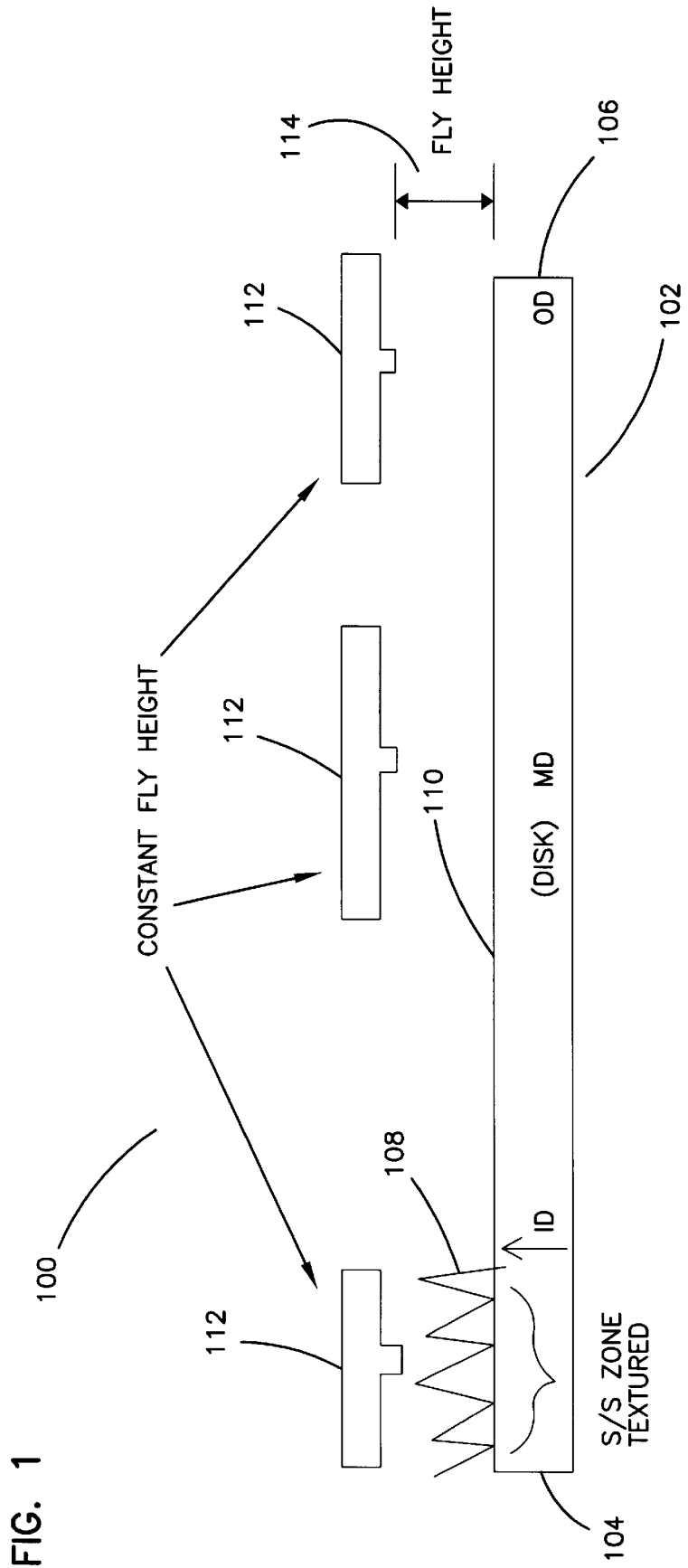
FIG. 1 illustrates a disk/slider combination according to the prior art.

FIG. 1 illustrates a disk/slider combination 100 according to the prior art. The disk 102 has a inner diameter 104 and an outer diameter 106. The inner diameter 104 includes a textured start-stop area 108 to decrease the torque required to start the disk after the air bearing slider has come to rest thereon. The remaining portion of the disk 102 is relatively smooth 110. Those skilled in the art will recognize that the entire surface of the disk may include a textured surface. However, those skilled in the art will also recognize that the texture is much more coarse over the start-stop area 108. Accordingly, the texture surface is not drawn to scale in FIG. 1, but rather illustrates the fly light profile of the disk/slider combination and its inherent drawbacks according to the prior art. According to the prior art as illustrated in FIG. 1, the air bearing slider 112 exhibits a relatively flat fly height 114 regardless of its position over the disk 102.

Figure 2:
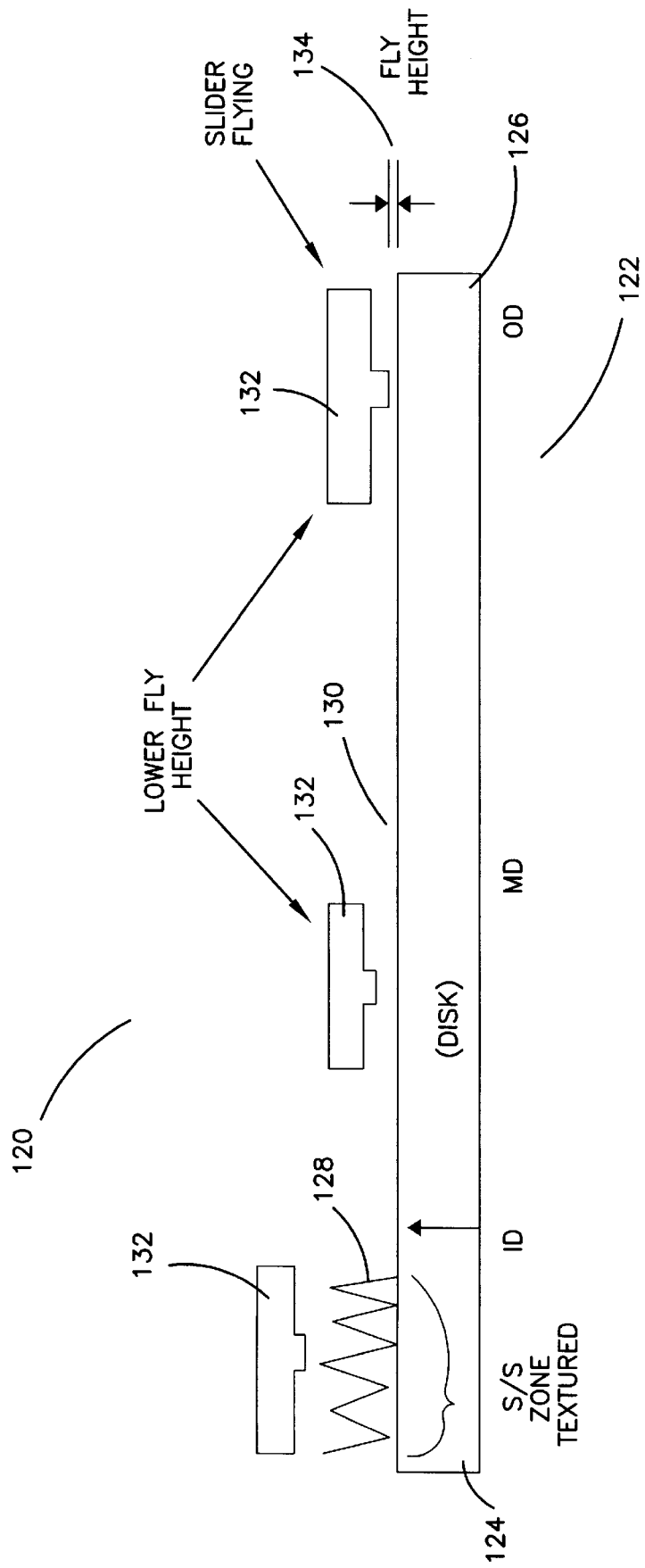
FIG. 2 illustrates a disk/slider combination according to the present invention.

FIG. 2 illustrates a disk/slider combination 120 according to the present invention. Similarly to FIG. 1, the disk 122 in FIG. 2 has a inner diameter 124 and an outer diameter 126, wherein the inner diameter 124 includes a start-stop zone which is textured 128. The remaining portion of the disk 130 is again relatively smooth. The air bearing slider 132 exhibits a selected fly height over the textured zone 128 as illustrated in FIG. 1. However, as the air bearing slider 132 is positioned away from the textured zone 128 to a position over the smooth zone 130, the air bearing slider 132 exhibits a lower fly height 134.

Figure 3:
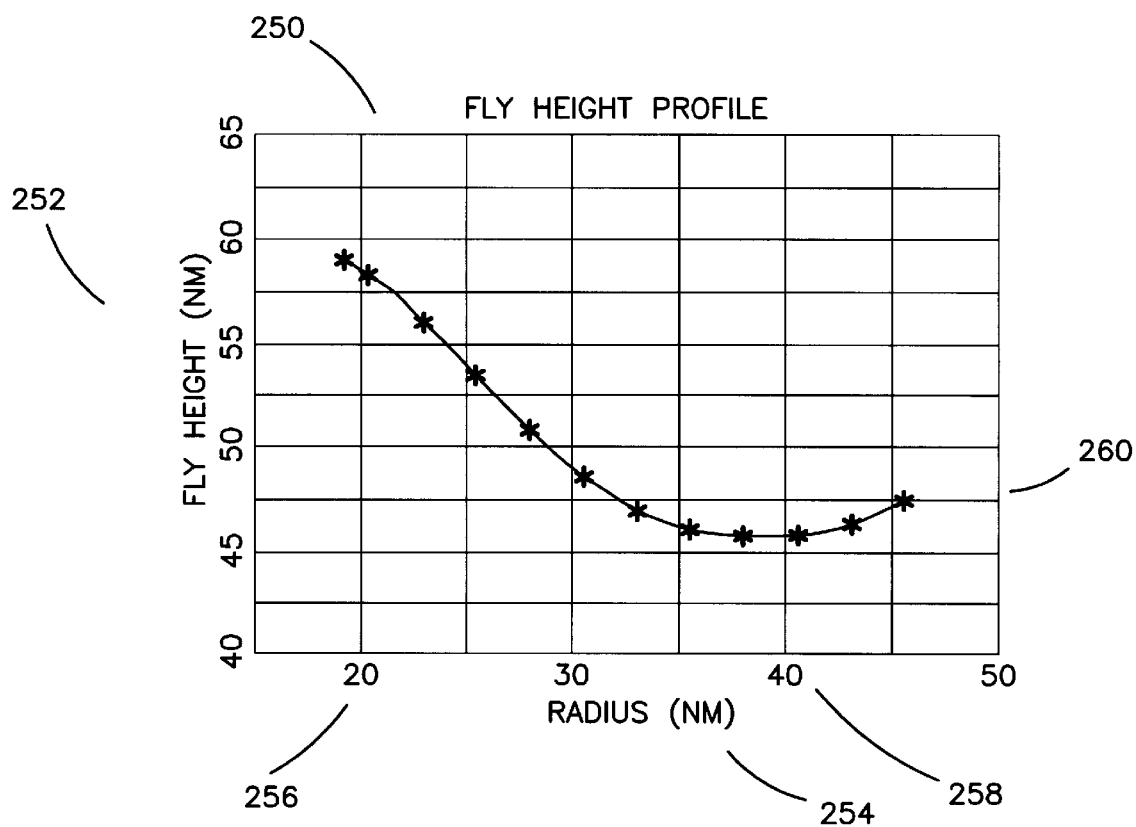
FIG. 3 illustrates the graph of the minimum fly height versus radius for the air bearing slider of FIG. 6.
Figure 6:
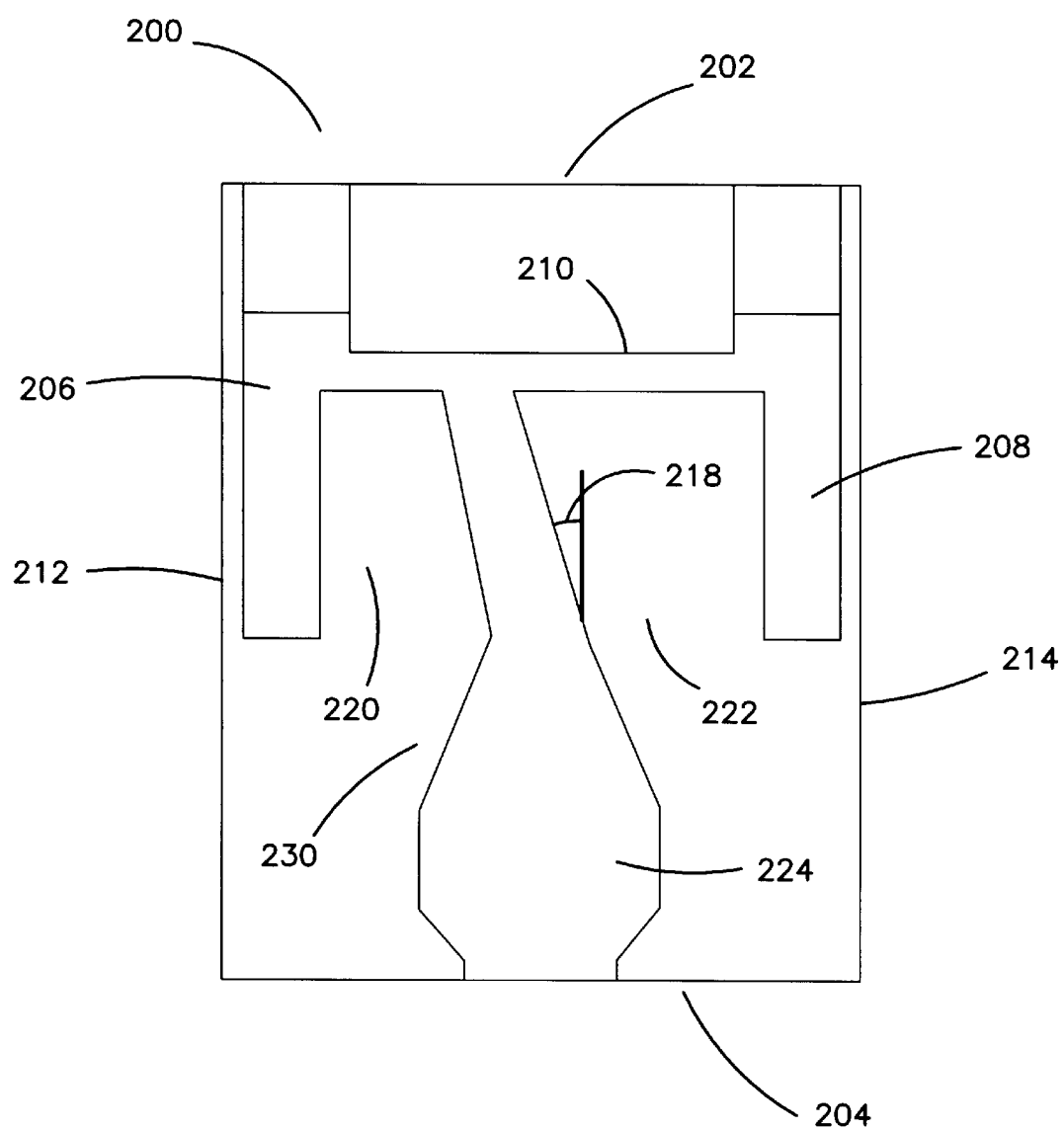
FIG. 6 illustrates the features of an air bearing slider having a skewed center rail to cause the slider to fly higher over the texture zone than over the smooth data zone of a disk according to the present invention.

FIG. 3 illustrates the graph 250 of the minimum fly height 252 versus radius 254 for the air bearing slider 200 illustrated in FIG. 6. As can be seen from the graph, the air bearing slider exhibits a relatively high fly height at the inner diameter 256 and quickly tapers off to a lower fly height at the outer diameter 258. Toward the outer diameter, the air bearing slider 200 exhibits a relatively flat or constant fly height 260.

Figure 4:
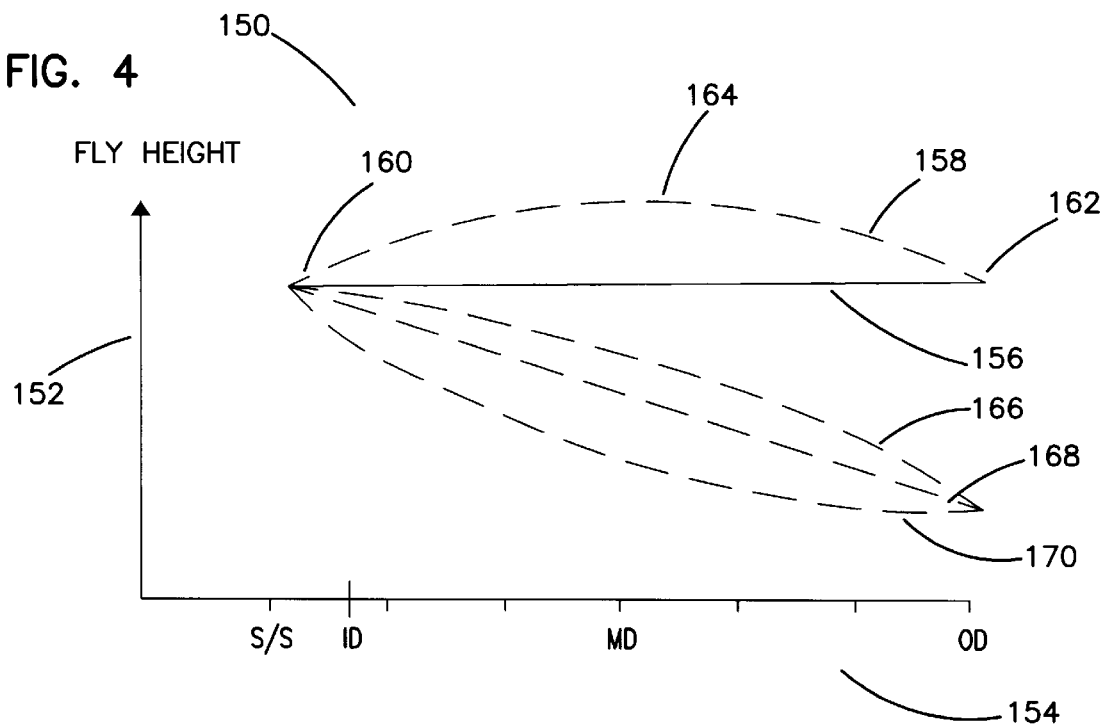
FIG. 4 is a graph of the fly height versus the radius for several sliders according to the present invention.

FIG. 4 is a graph 150 of the fly height 152 for several sliders versus the radius 154. The solid line 156 illustrates the constant fly height of an air bearing slider as illustrated in FIG. 1. The uppermost broken line 158 illustrates an air bearing slider that has a substantially flat or constant fly height but which flies higher towards the middle diameter of the disk than at the inner and outer diameters. The remaining three lines 166, 168, 170 illustrate sliders which have higher fly heights over the inner diameter zone than at the outer diameter according to the present invention.

Figure 5:
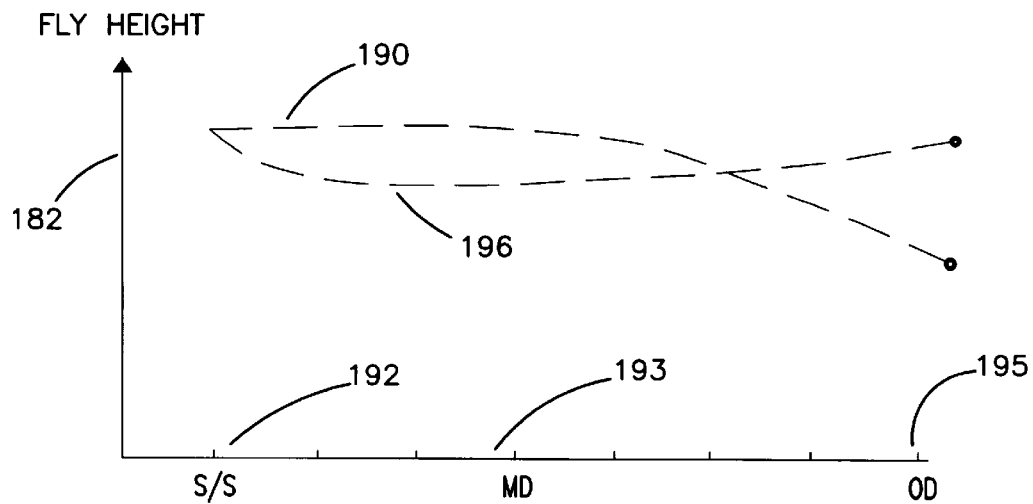
FIG. 5 illustrates a graph of fly height versus radius for two further embodiments of the present invention.

FIG. 5 illustrates a graph 180 of fly height 182 versus radius 184 for two additional embodiments of the present invention. The first profile 190 exhibits a substantially flat characteristics from the start-stop zone 192 until beyond the middle diameter 193 and then drops as it approaches the outer diameter 195. The second profile 196 shows an air bearing slider which has a fly height which drops immediately after leaving the textured start-stop zone 192 and which is substantially straight over the remaining portion of the disk. However, those skilled in the art will recognize that the profile may be selected so the slider rides slightly higher at the outer-diameters. For example, this would provide greater mechanical benefit at the out-diameter where the data rates are saturated thereby negating the benefit of having a low fly height.

FIG. 6 illustrates the features of an air bearing slider 200 which flies higher over the texture zone than over the smooth data zone of a disk. The air bearing slider 200 includes a leading edge 202 and a trailing edge 204 disposed at opposite ends of a longitudinal axis running the length of the slider. The air bearing slider 200 further includes a left rail 206, a right rail 208 and a center connecting crossbar 210 therebetween. The left rail 206 and right rail 208 are substantially parallel to sides 212, 214 of the air bearing slider 200 which are in turn parallel to the longitudinal axis. The crossbar 210 may be either perpendicular or oblique to the sides 212, 214 of the slider 200. Extending from the center crossbar 210 is a center rail 230 which is skewed 218 at an angle relative to the sides 212, 214 of the air bearing slider 200. The angle of the center rail 230 with respect to the sides 212, 214 of the slider 200 is selected to create a high air pressure at the inner radii of the recording medium substantially aligned with the air flow at that location thereby causing the slider 200 to fly high over the inner radii and a second, lower air pressure at non-inner radii of the recording medium that allows the slider 200 to fly lower over the non-inner radii. Thus, the non-inner radii correspond to the non-textured area of the disk. Two generally U-shaped recessed areas 220, 222 are formed between the center rail 230 and the two side rails 206, 208 for creating negative pressure as the disk spins beneath the air bearing slider 200. At the trailing edge 204 of the center rail 230, a broader area 224 for mounting a magnetic element is provided.

Figure 7:
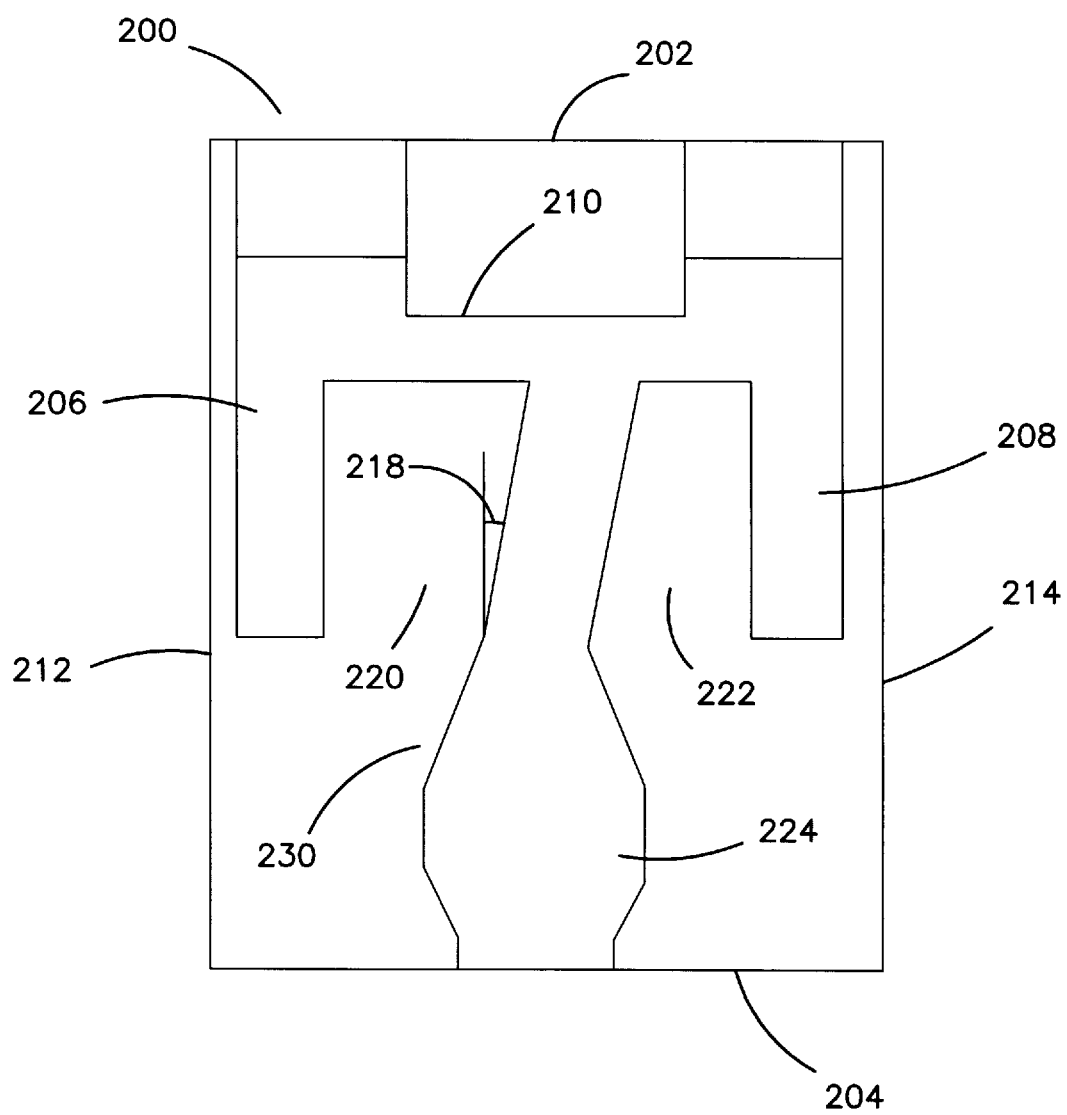
FIG. 7 illustrates the features of an air bearing slider wherein the skew angle of the center rail is reversed.

However, it is to be understood that the embodiment discussed herein are presented for illustration only and are not meant to limit the invention. Those skilled in the art will recognize that other embodiments incorporating the teaching of the present invention are possible without departing from the invention. For example, the skew angle 218 of the center rail 230 may be reversed as illustrated in FIG. 7. to increase the air pressure at outer diameters thereby increasing the lift at the outer diameters and providing better mechanical performance. Further, the thickness of the crossbar 210 and side rails 206, 208 may be varied to optimize performance with departing from the invention (e.g., FIG. 7).

Figure 8:
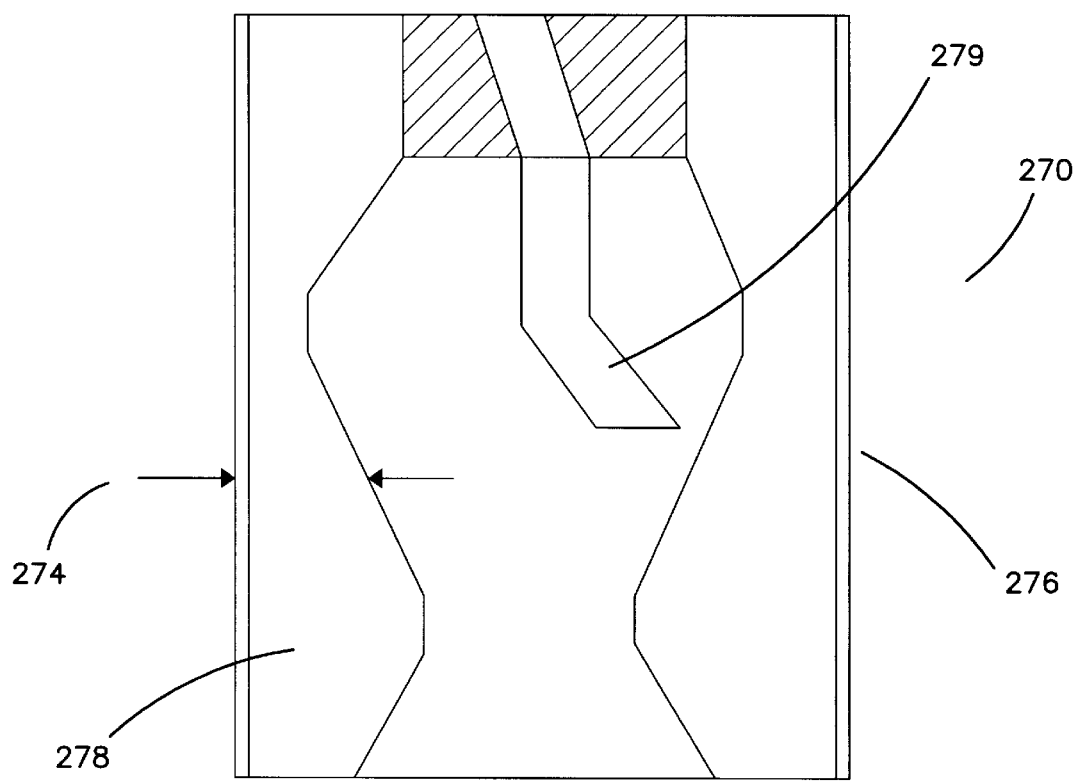
FIG. 8 illustrates a three rail air bearing slider having variable width side rails for supporting magnetic elements and a central rail angled according to the invention.

FIG. 8 illustrates a three rail air bearing slider 270 wherein the width 272 of the side rails 274 varies along the longitudinal axis 276. The side rails 274 form a support surface 278 for mounting a magnetic head (not shown). The center rail 279 is angled with respect to the longitudinal axis 276 according to the invention to create a first air pressure distribution for a first fly height at first predetermined radii of the recording medium and a second air pressure distribution for a second fly height at second predetermined radii of the recording medium.

Figure 9:
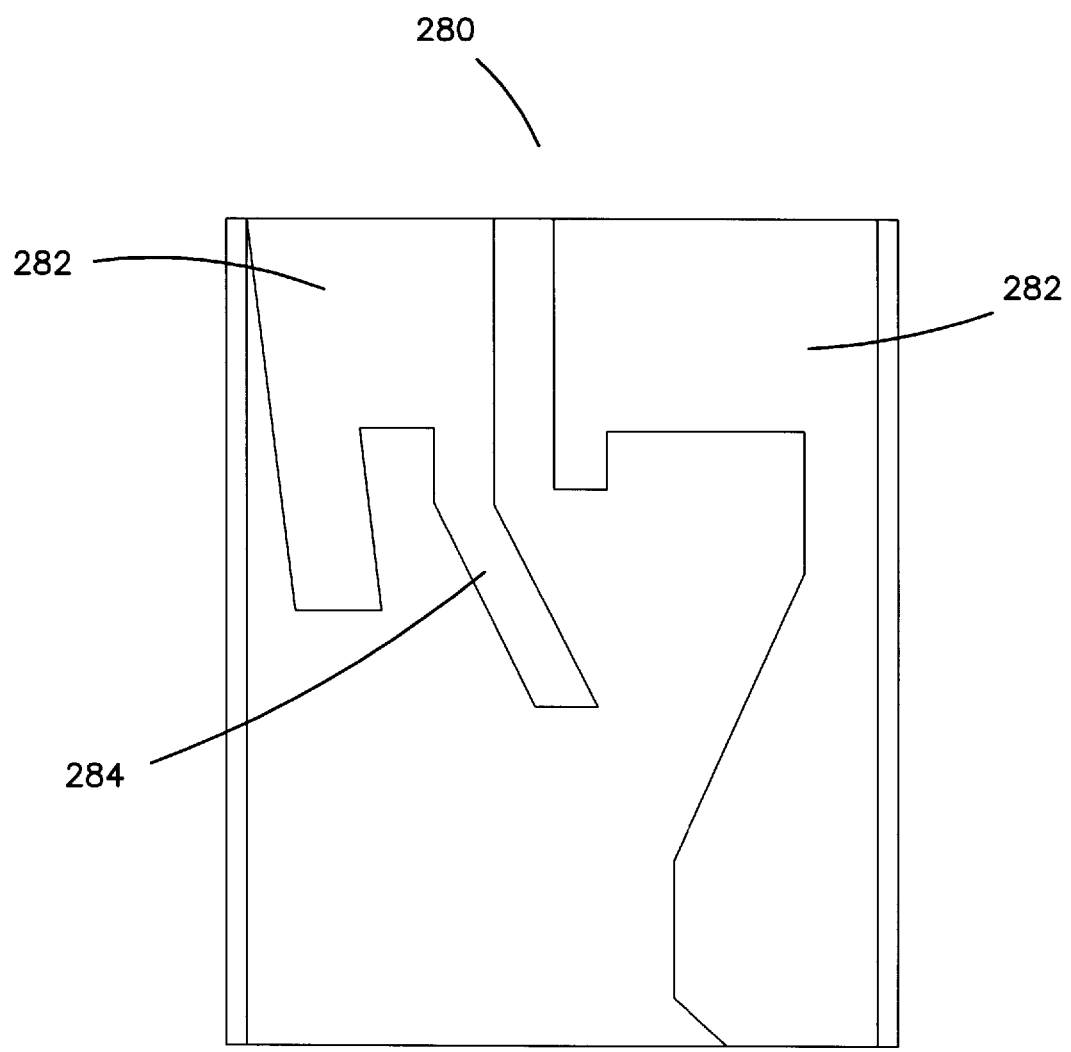
FIG. 9 illustrates a two rail slider wherein a subrail having angled features according to the invention is integral with a side rail.

FIG. 9 illustrates a two rail air bearing slider 280 wherein one of the side rails 282 includes an angled subrail 284. The sub-rail 284 causes the slider 280 to fly high over the inner radii as a result of a first air pressure distribution and to fly low over the outer radii of the recording medium as a result of a second air pressure distribution.

Figure 10:
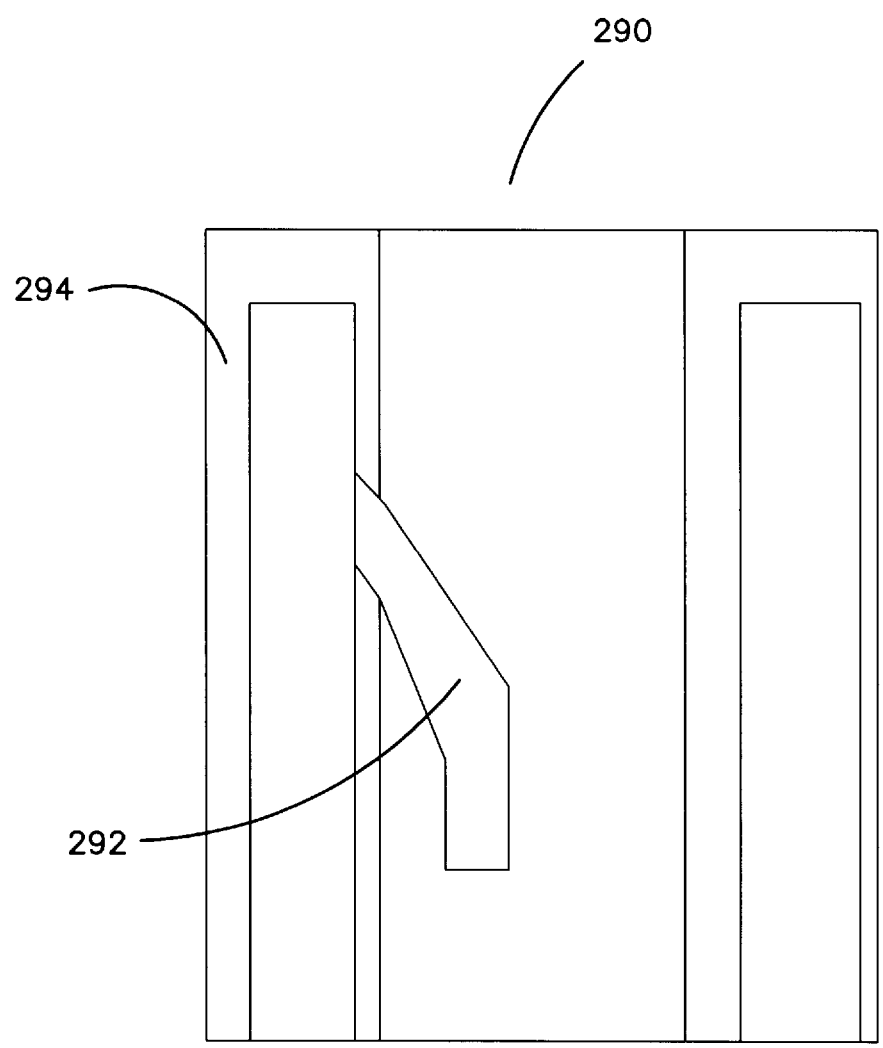
FIG. 10 illustrates a two rail slider with an angled appendage according to the present inventions.

FIG. 10 also illustrates a two rail air bearing slider 290 wherein an appendage 292 angles away from the side rail 294. The appendage 292 causes the air bearing slider 290 to fly high over the inner textured zone and comparatively low with respect to outer diameters.

Figure 11:
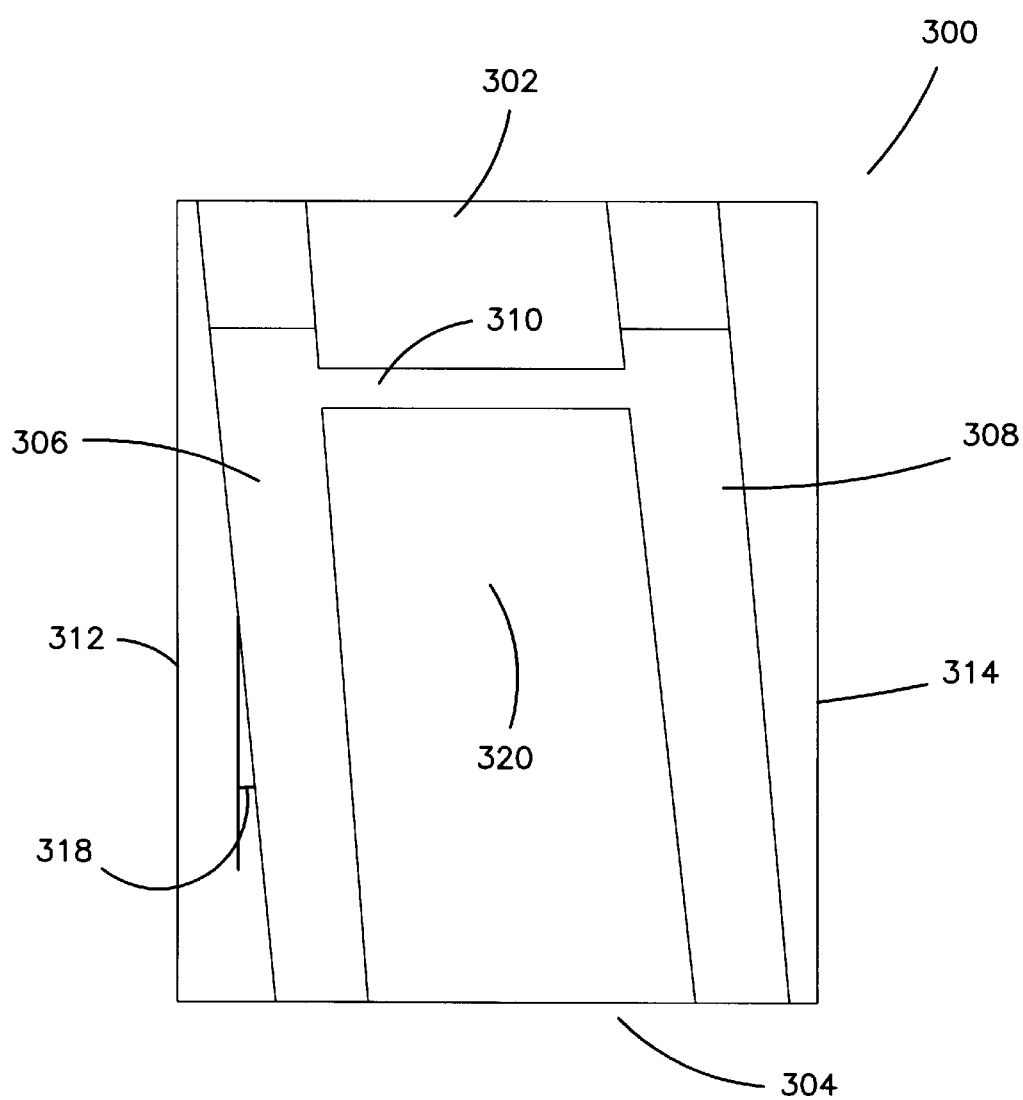
FIG. 11 illustrates a two rail negative pressure design of an air bearing slider according to the present invention.

FIG. 11 illustrates a two rail negative pressure design 300 of an air bearing slider according to the present invention. The air bearing slider has a leading edge 302, a tailing edge 304, and two side rails 306, 308 which are both skewed 318 relative to the left 312 and right sides 306, 308 of the air bearing slider 300. The two side rails 306, 308 are connected by a transverse center crossbar 310. A recessed negative pressure area 320 is formed between the two side rails 306, 308. The angle 318 of the two side rails 306, 308 relative to the sides 312, 314 of the slider increases the lift of the air bearing slider 300 at the inner diameter wherein air flow is aligned. While those skilled in the art will recognize that skewing the entire head may result in a more desirable profile, greater benefits are achieved by angling the bearing geometry to quickly lower the head at the middle diameters. However, as the air bearing slider 300 is positioned away from the inner diameter, the skewing 318 of the two side rails 306, 308 has a lesser affect on the lift of the air bearing slider 300 because air skew is lower relative to longitudinal axis and therefore enables the air bearing slider 300 to fly lower at the outer diameters.

Figure 12:
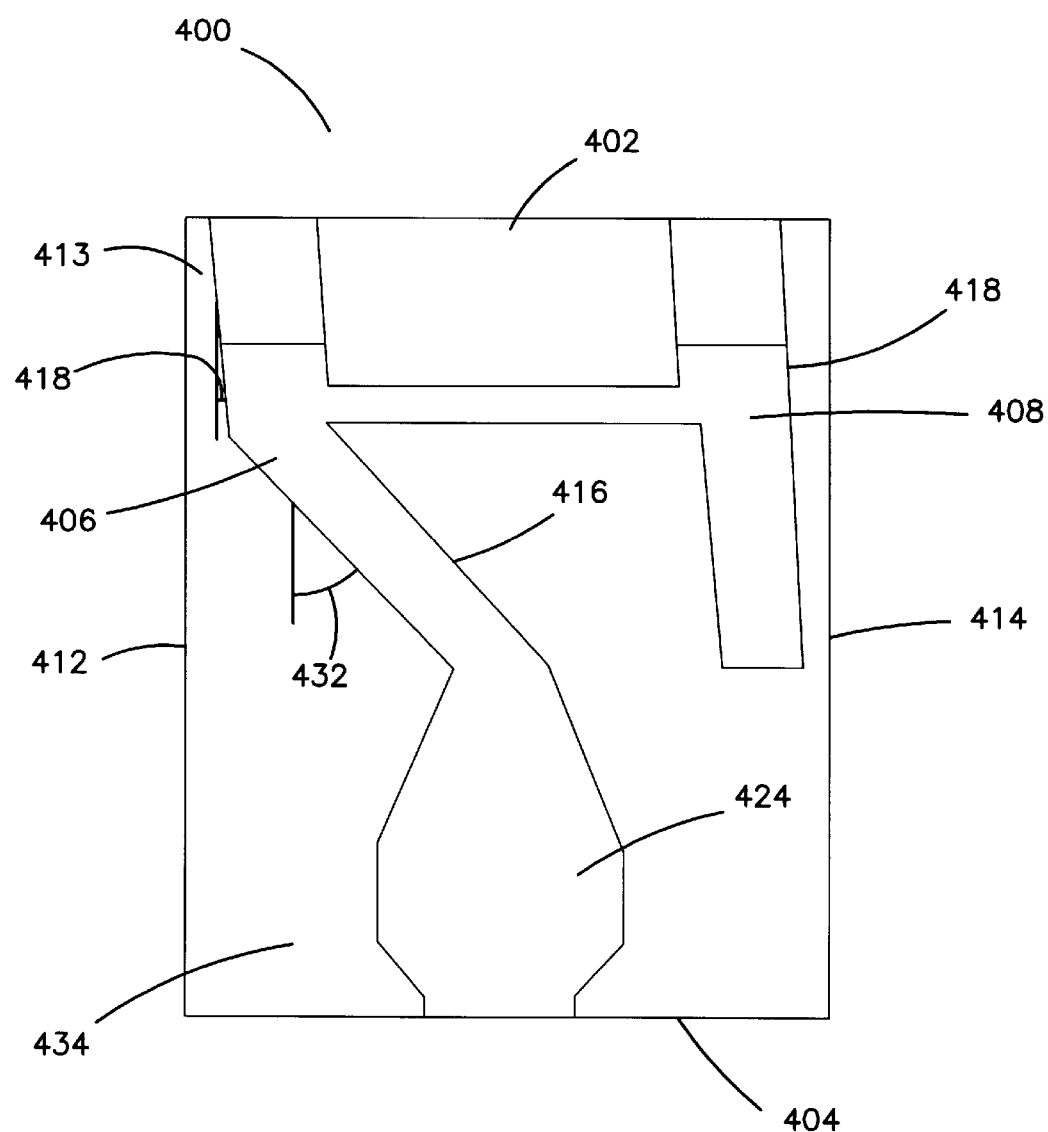
FIG. 12 illustrates a second embodiment for a two rail negative pressure design for an air bearing slider according to the present invention.

FIG. 12 illustrates another two rail negative pressure design 400 for an air bearing slider according to the present invention. The air bearing slider 400 includes two side rails 406, 408 generally adjacent respectively to the left 412 and right side 414 of the support structure 413 of the slider body 400. The air bearing slider 400 has a leading edge 402 and a trailing edge 404. The right rail 408 tapers toward the trailing edge 404 of the slider and the trailing edge 409 of the right rail 408 is shortened with respect to the trailing edge 404 of the air bearing slider 400. Furthermore, the right rail 408 is skewed 418 with respect to the sides 412, 414 of the air bearing slider 400. The left rail 406 is also skewed and has an extended neck portion 416 which slants sharply 432 toward the center of the air bearing slider 400. The trailing edge 434 of the left rail 406 includes a broadened area 424 for supporting a magnetic element thereon and extends to the trailing edge 404 of the support structure.

Figure 13:
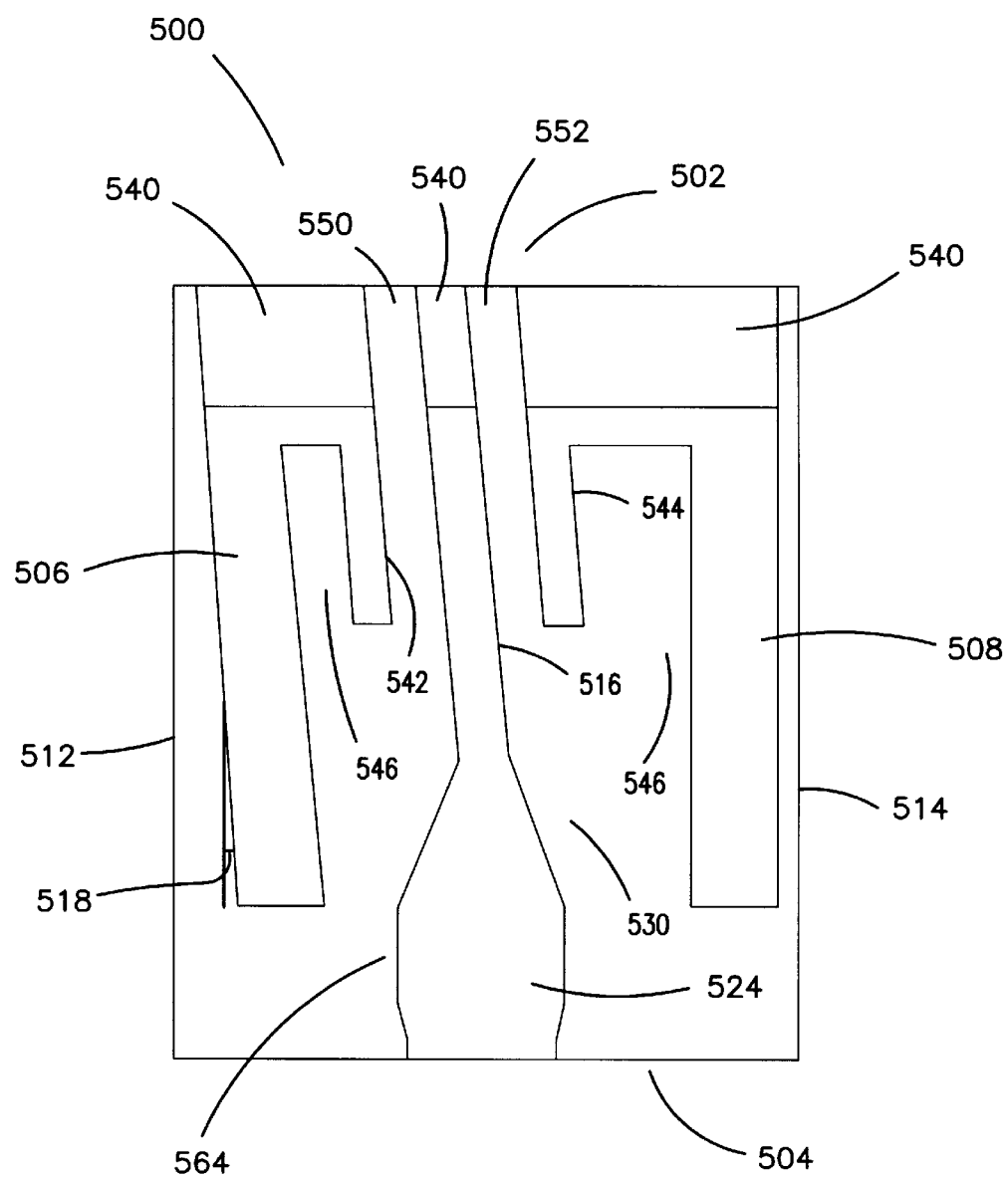
FIG. 13 illustrates an embodiment of the present invention wherein two side rails each have an inner subrail that extends from each side rail.

FIG. 13 illustrates another embodiment 500 of the present invention. The air bearing slider 500 is formed with two side rails 506, 508, each having a tapered section 540 at the leading edge 502. An inner subrail 542, 544 extends respectively from the tapered section of each side rail 506, 508. The tapered sections 540 and the inner sides of the two rails 506, 508 border on recessed sections 546 which are formed by etching, ion milling or other appropriate techniques. In operation, the recessed sections 546 form two pockets of negative pressure which reduce the requirement of high static loading on the air bearing slider 500. A center rail 530 is positioned between the two side rails 506, 508 forming two channels 550, 552 on either side thereof. Each channel 550, 552 passes between the sub-rails 542, 544 of side rails 506, 508 and center rail 530. Further, the channels 550, 552 extend from the tapered sections respectively towards the trailing edge 505. A transducer may be bonded to or intricately formed on the trailing edge 564 of the center rail 530. For this purpose, a broadened section 524 is provided at the trailing edge 564 of the center rail 530 extending from the neck 516. The two side rails 506, 508 extend from the tapered section 540 towards the trailing edge 504 but do not extend the entire length of the air bearing slider. The left side rail 506 is angled 518 with respect to the sides 512, 514 of the slider 500. Further, the channels 550, 552, the neck 516 of the center rail, and the subrail 544 of the right side rail 508 are also angled with respect to the sides 512, 514.

Figure 14:
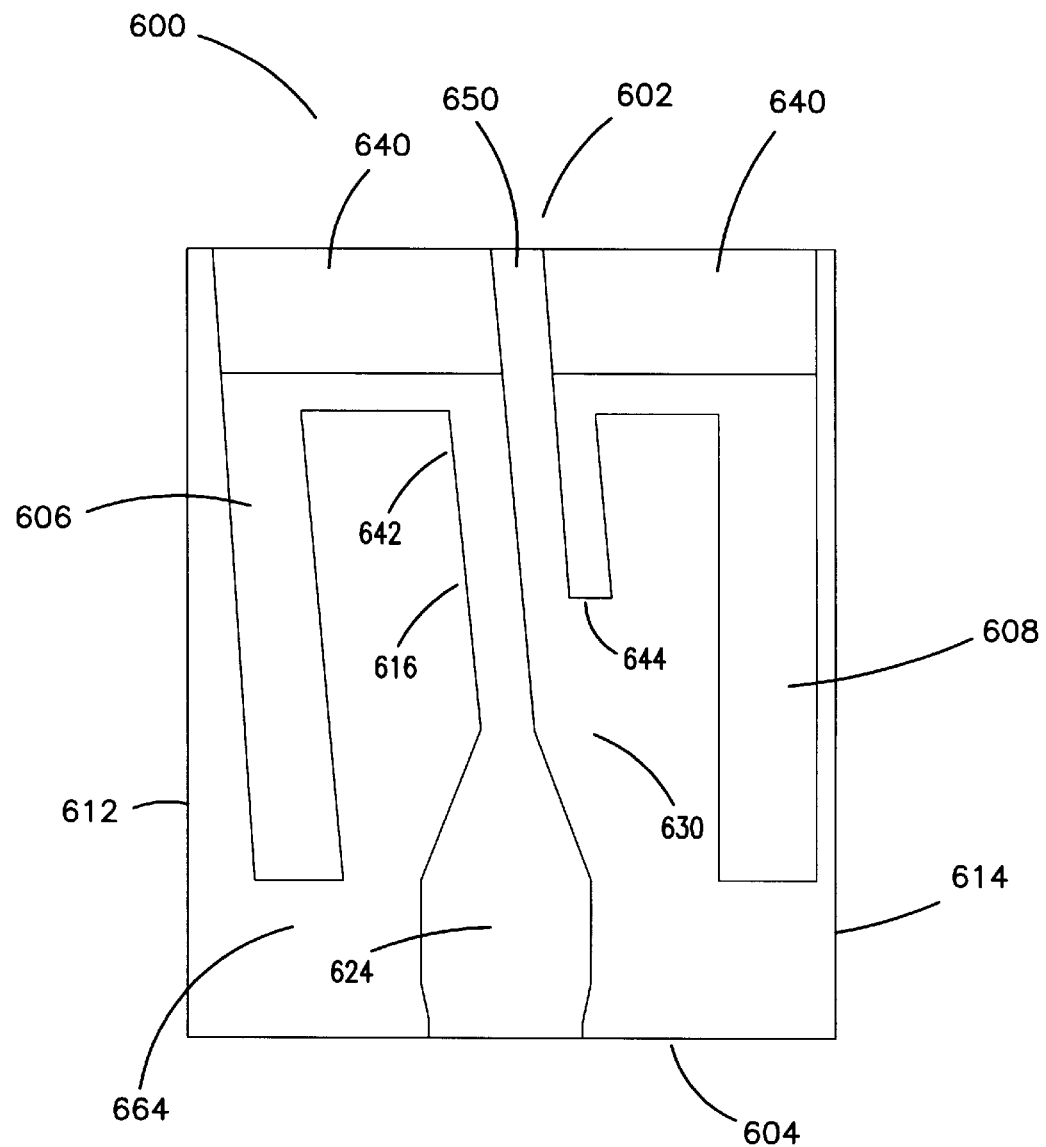
FIG. 14 illustrates an embodiment of the invention wherein the center rail is integral with the sub-rail of the left side rail.

FIG. 14 illustrates another embodiment of the invention wherein the center rail 630 is integral with the sub-rail 642 of the left side rail 606. Accordingly only a single channel 650 is formed between the two side rails 606, 608. The channel 650, the center rail 630, the left side rail 606, and the subrail 644 of the right rail 608 are all slanted with respect to the sides 612, 614 of the air bearing slider 600 to provide a skew angle according to the present invention.

Figure 15:
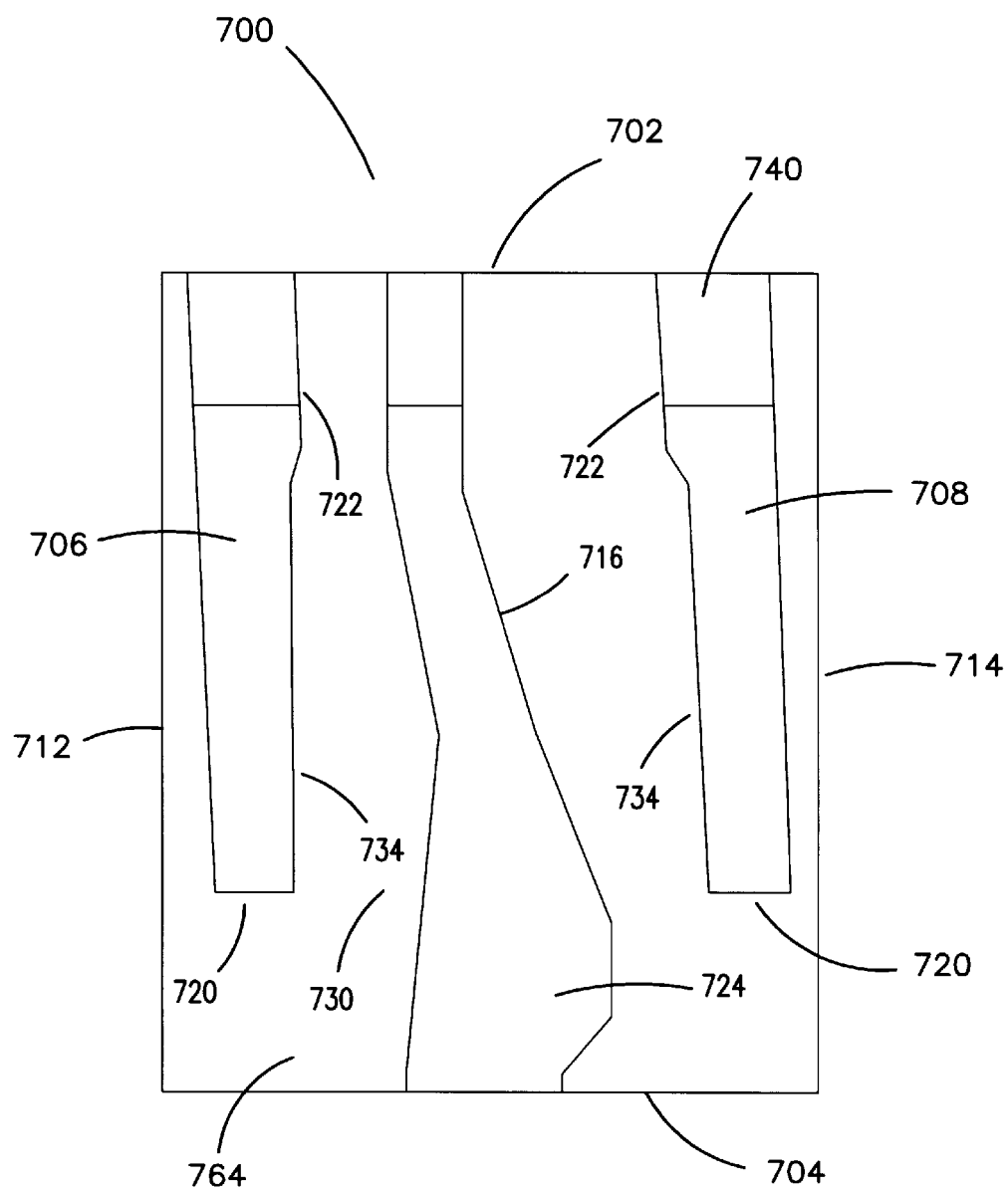
FIG. 15 illustrates a three rail positive pressure air bearing slider having skewed geometries according to the present invention.

FIG. 15 illustrates a three rail positive pressure air bearing slider 700 having skewed geometries according to the present invention. The air bearing slider 700 has a leading edge 702 and a trailing edge 704. The air bearing slider 700 also includes two side rails 706, 708 adjacent respectively to the left 712 and right sides 714 of the support structure. The two side rails 706, 708 are skewed relative to the sides 712, 714 of the air bearing slider 700 and both side rails 706, 708 taper off 720 before reaching the trailing edge 704 of the air bearing slider 700. The leading edges 722 of the side rails 706, 708 are wider than the trailing edges 734 of the side rails 706, 708. A center rail 730 extends from the leading edge 702 towards the trailing edge 704 of the air bearing slider 700. The center rail includes a neck 716 and a broadened portion 724 at the trailing edge 704 of the air bearing slider 700. The neck 716 of the central rail 730 is skewed with respect to the sides 712, 714 of the air bearing slider 700 to provide increased lift pressure at inner diameters according to the present invention.

Figure 16:
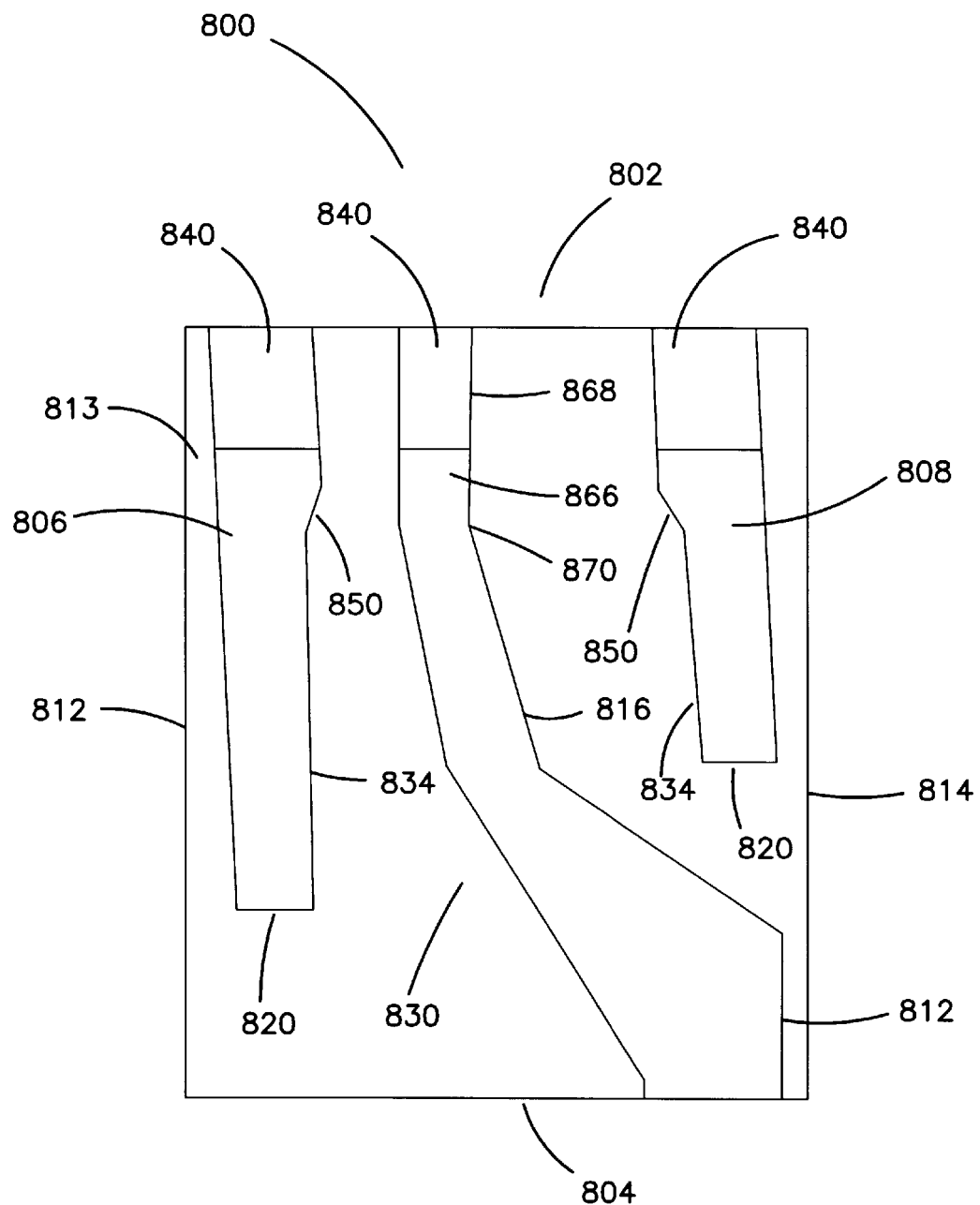
FIG. 16 illustrates a second embodiment of a three rail, positive pressure air bearing slider according to the present invention.

FIG. 16 illustrates another three rail, positive pressure air bearing slider 800 according to the present invention. The air bearing slider 800 consists of two side rails 806, 808 adjacent respectively to the left side 812 and right side 814 of a support structure or slider body 813. The air bearing slider 800 has a leading edge 802 and a trailing edge 804. Each of the side rails 806, 808 is broader at the leading edge 802 as the inside edges 850 of the side rails 806, 808 angle inwardly just beyond the tapered section 840 at the leading edge 802. Further, both side rails 806, 808 are angled with respect to the sides 812, 814 of the air bearing slider 800. The trailing edges 834 of the side rails are shortened 820 with respect to the trailing edge 804 of the slider, but with the left rail 806 extending further toward that trailing edge 804 than the right side rail 808.

A center rail 830 is positioned between the two side rails 806, 808 and extends from the leading edge 802 to the trailing edge 804. The leading edge 866 of the center rail is relatively narrow with sides 868 that are generally parallel to the sides 812, 814 of the air bearing slider 800. However, at about one-third to one-fourth 870 of the length of the air bearing slider 800, the center rail 830 forms a neck 816 which slants toward the right side 814 of the air bearing slider 800. As the center rail 830 approaches the trailing edge 804, the center rail 830 bends even sharper toward the right side 814 of the air bearing slider 800 and forms a broadened area 824. Finally, as the center rail 830 contacts the trailing edge 804 at the right edge 814, the sides 872 of the center rail become parallel to the sides 812, 814 of the air bearing slider 800. The broadened surface area 824 at the trailing edge 864 of the center rail 800 provides a location for mounting a magnetic element or transducer.

Figure 17:
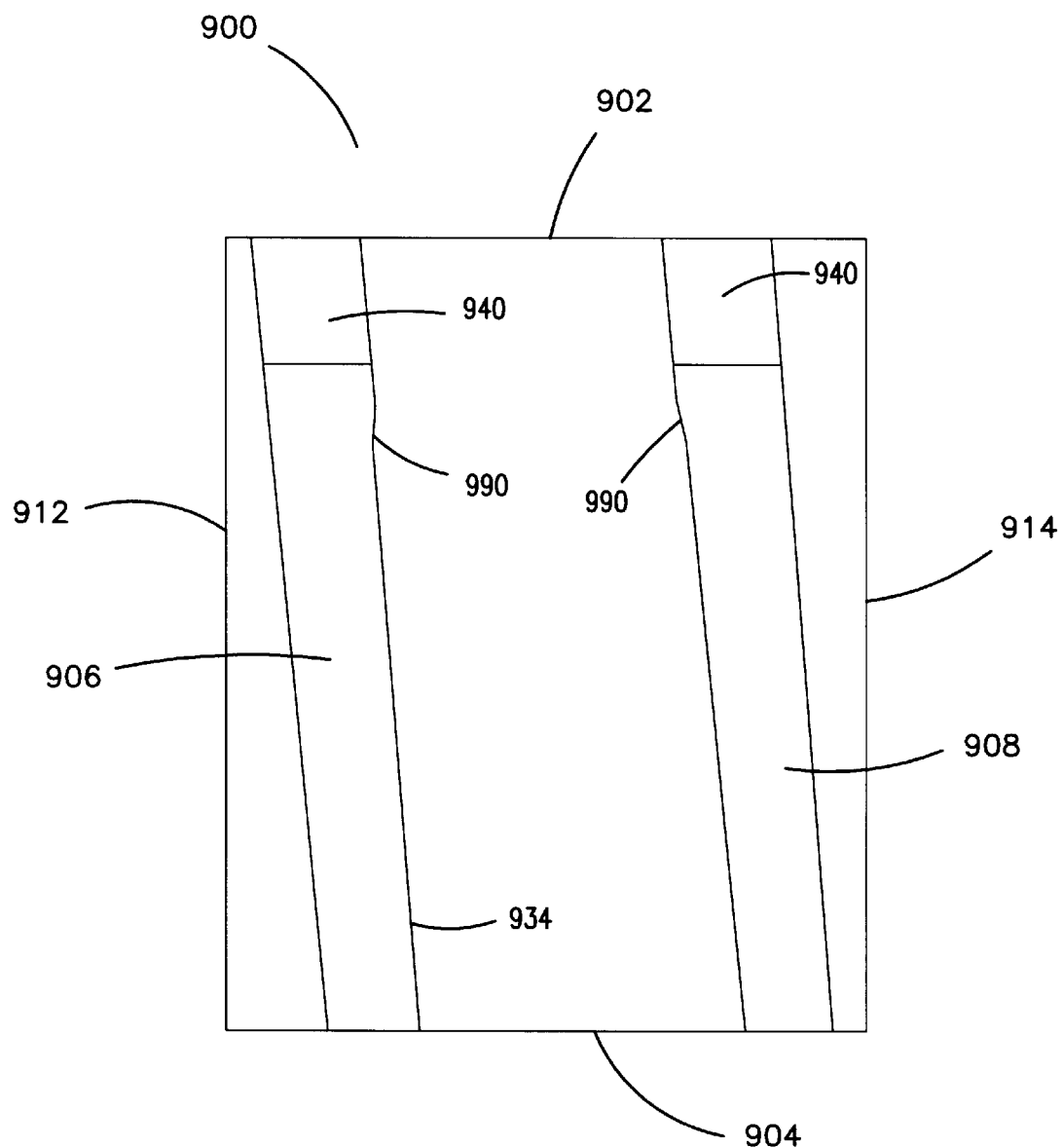
FIG. 17 illustrates a two rail, positive pressure air bearing slider according to the present invention.

FIG. 17 illustrates a two rail, positive pressure air bearing slider 900 according to the present invention. The air bearing slider 900 consists of two side rails 906, 908 adjacent respectively to the left side 912 and right side 914 of a support structure or slider body 913. The air bearing slider 900 has a leading edge 902 and a trailing edge 904. Each of the side rails 906, 908 is broader at the leading edge 902 as the inside edges 990 of the side rails 906, 908 angle inwardly just beyond the tapered section 940 at the leading edge 902. Further, both side rails 906, 908 are angled with respect to the sides 912, 914 of the air bearing slider 900. The trailing edge 934 of the side rails 906, 908 extend to the trailing edge 904.

Figure 18:
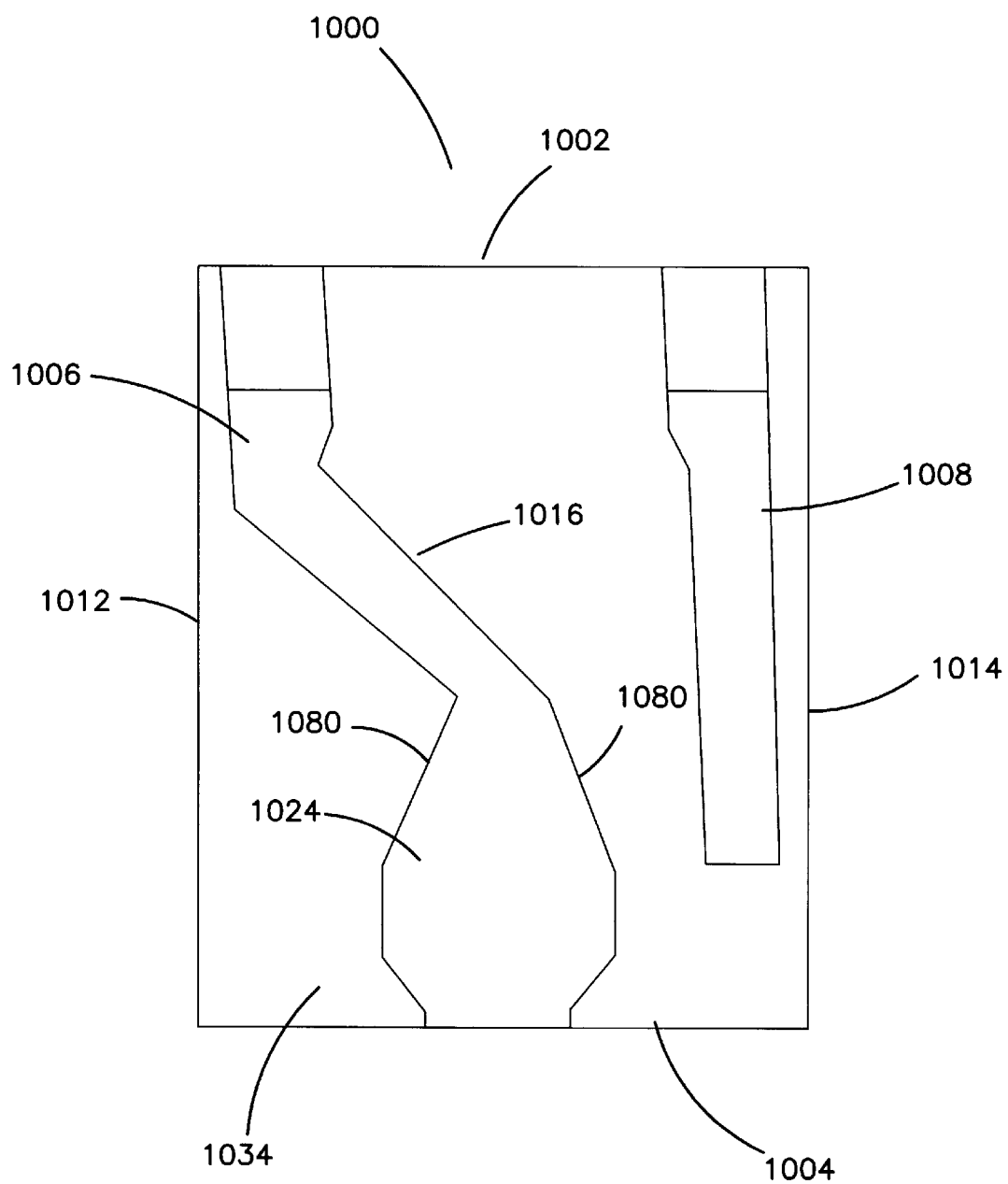
FIG. 18 illustrates a second two rail, positive pressure air bearing slider according to the present invention.

FIG. 18 illustrates another two rail, positive pressure air bearing slider 1000 according to the present invention. The air bearing slider 1000 consists of two side rails 1006, 1008 adjacent respectively to the left side 1012 and right side 1014 of a support structure or slider body 1013. The air bearing slider 1000 has a leading edge 1002 and a trailing edge 1004. The right side rail 1008 is shaped as shown and described with respect to FIG. 16. Both side rails 1006, 1008 are angled with respect to the sides 1012, 1014 of the air bearing slider 1000. However, at about one-third to one-fourth 1070 of the length of the air bearing slider 1000, the left rail 1006 slants toward the right side 1014 of the air bearing slider 1000. As the left rail 1006 approaches the middle of the air bearing slider 1000, the trailing end 1034 of the left rail 1006 bends back in alignment with the edges 1012, 1014 of the air bearing slider 1000. Nevertheless, at this point the sides 1080 of the left rail diverge to form a broadened area 1024. The sides 1080 become parallel and converge before becoming parallel again to touch the trailing edge 1004 of the air bearing slider 1000. The broadened surface area 1024 at the trailing edge 1034 of the left rail 1006 provides a location for mounting a magnetic element or transducer.

Figure 19:
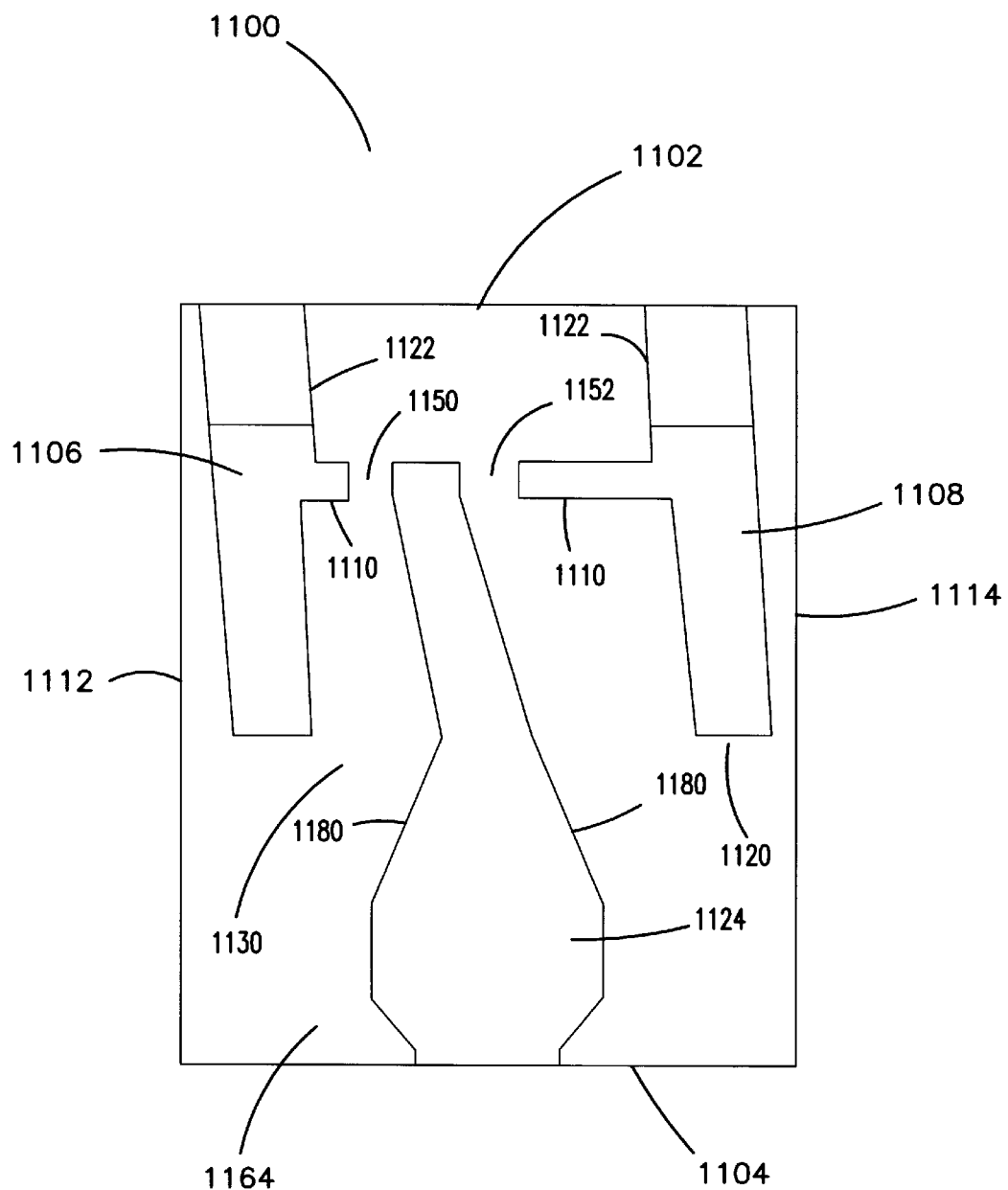
FIG. 19 illustrates a three rail, vented, negative pressure air bearing slider according to the present invention.

FIG. 19 illustrates a three rail, vented, negative pressure air bearing slider 1100 according to the present invention. The air bearing slider 1100 consists of two side rails 1106, 1108 adjacent respectively to the left side 1112 and right side 1114 of a support structure or slider body 1113. The air bearing slider 1100 has a leading edge 1102 and a trailing edge 1104. Each of the side rails 1106, 1108 is broader at its leading edge 1122 since the side rails 1106, 1108 converge where the rails 1106, 1108 extend towards the trailing edge 1104 of the air bearing slider 1100. Further, both side rails 1106, 1108 are angled with respect to the sides 1112, 1114 of the air bearing slider 1100 and the trailing edges 1120 of the side rails 1106, 1108 are shortened with respect to the trailing edge 1104. The side rails 1106, 1108 also include a crossbar 1110 portion which extends toward the center of the air bearing slider 1100. However, the crossbar portions 1110 do not meet to form a integral crossbar. Rather, gaps or isolation channels 1150, 1152 are formed between the two crossbar sections 1110.

A center rail 1130 is disposed within the gaps 1150, 1152. The center rail 1130 is also angled with respect to the sides 1112, 1114 of the air bearing slider 1100. In addition, as the center rail 1130 approaches the middle of the air bearing slider 1100, the neck 1116 of the center rail 1130 bends back generally in alignment with the edges 1112, 1114 of the air bearing slider 1100. Nevertheless, at this point the sides 1180 of the left rail diverge to form a broadened area 1124 at the trailing edge. For example, the sides 1180 become parallel, and then converge before becoming parallel again where they touch the trailing edge 1104 of the air bearing slider 1100. The broadened surface area 1124 at the trailing edge 1114 of the center rail 1130 provides a location for mounting a magnetic element or transducer.

Figure 20:
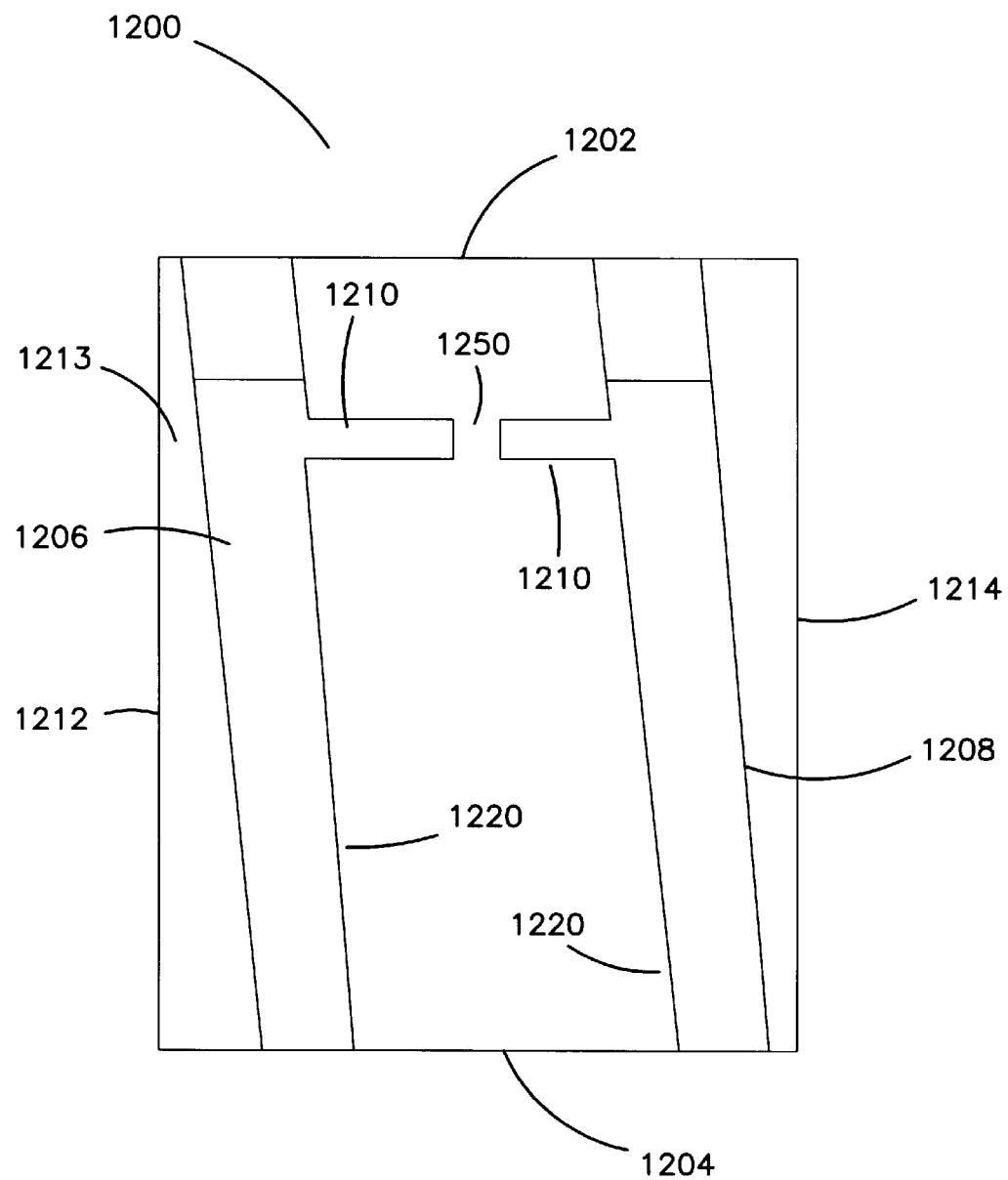
FIG. 20 illustrates a two rail, vented, negative pressure air bearing slider according to the present invention.

FIG. 20 illustrates a two rail, vented, negative pressure air bearing slider 1200 according to the present invention. The air bearing slider 1200 consists of two side rails 1206, 1208 adjacent respectively to the left side 1212 and right side 1214 of a support structure or slider body 1213. The air bearing slider 1200 has a leading edge 1202 and a trailing edge 1204. Both side rails 1206, 1208 are angled with respect to the sides 1212, 1214 of the air bearing slider 1200 and the trailing edges 1220 of both side rails 1206, 1208 extend to the trailing edge 1204. The side rails 1206, 1208 also include a crossbar portion 1210 which extends toward the center of the air bearing slider 1200. However, the crossbar portions 1210 do not meet to form a integral crossbar. Rather, a gap or isolation channel 1250 is formed between the two crossbar sections 1210 to increase the negative pressure.

Figure 21:
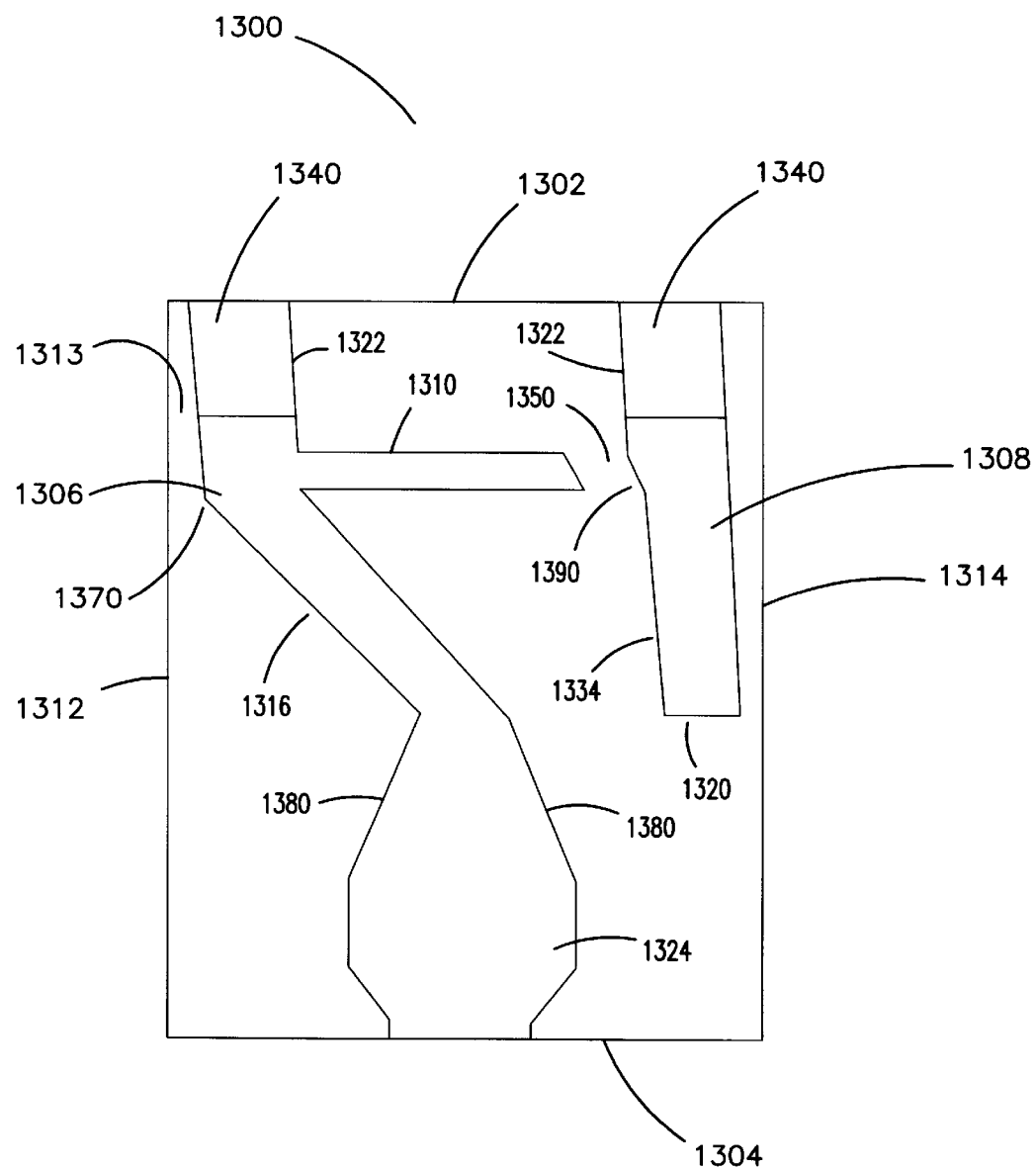
FIG. 21 illustrates a second embodiment for a two rail, vented, negative pressure air bearing slider according to the present invention.

FIG. 21 illustrates a two rail, vented, negative pressure air bearing slider 1300 according to the present invention. The air bearing slider 1300 consists of two side rails 1306, 1308 generally adjacent respectively to the left side 1312 and right side 1314 of a support structure or slider body 1313. The air bearing slider 1300 has a leading edge 1302 and a trailing edge 1304. Both side rails 1306, 1308 are angled with respect to the sides 1312, 1314 of the air bearing slider 1300. The right side rail 1308 is generally straight while being broader at the leading edge 1322 as the inside edge 1390 of the right side rail 1308 angles inwardly just beyond the tapered section 1340 at the leading edge 1302. Further, the trailing edge 1334 of the right side rail 1308 is shortened 1320 with respect to the trailing edge 1304 of the slider 1300. The neck 1316 of the left side rail 1306, however, slants toward the right side 1314 of the air bearing slider 1300. For example, the neck may begin to slant at about one-third to one-fourth 1370 of the length of the air bearing slider 1300.

As the left rail 1306 approaches the middle of the air bearing slider 1300, the trailing edge 1334 of the left rail 1306 bends back in alignment with the edges 1312, 1314 of the air bearing slider 1300. Nevertheless, at this point the sides 1380 of the left rail 1306 diverge to form a broadened area 1324 at the trailing edge. For example, the sides 1380 become parallel, and then converge before becoming parallel again as they touch the trailing edge 1304 of the air bearing slider 1300. The broadened surface area 1324 at the trailing edge 1334 of the left rail 1306 provides a location for mounting a magnetic element or transducer. The left rail 1306 also has a thin crossbar section 1310 attached thereto which extends almost completely to the right side rail 1308. However, a gap or isolation channel 1350 exists between the right side rail 1308 and the crossbar 1310.

Figure 22:
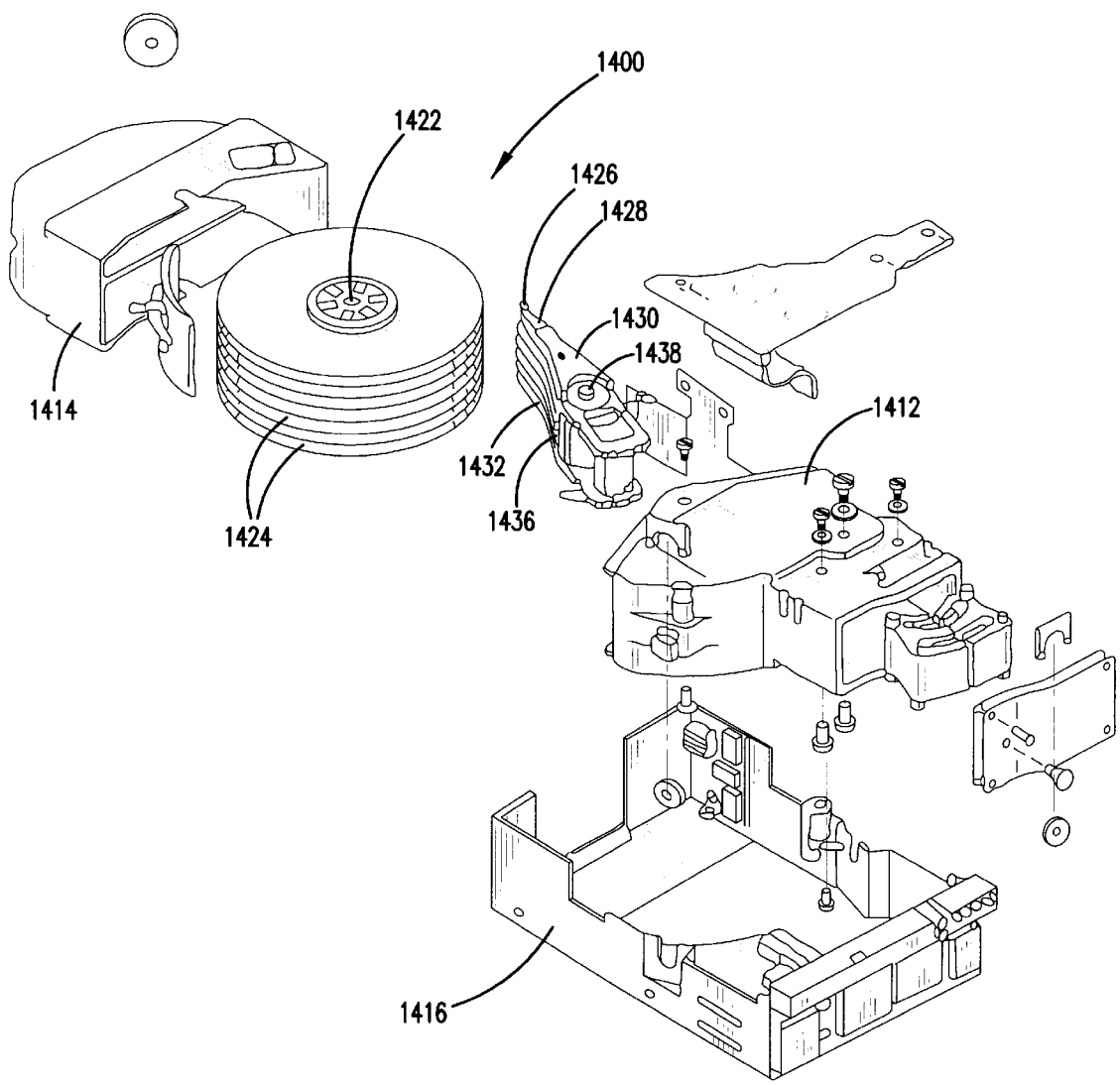
FIG. 22 is an exploded view of a disk drive operable in accordance with the invention.

FIG. 22 is an exploded view of a disk drive 1400. The disk drive 1400 includes a housing 1412 and a housing cover 1414 which, after assembly, is mounted within a frame 1416.

Mounted within the housing is a spindle shaft 1422. Rotatably attached to the spindle shaft 1422 are a number of disks 1424. In accordance with the invention, each disk will include a textured zone and a non-textured zone. The textured zone reduces stiction so that the start/stop life of the disk drive is increased. In FIG. 22, eight disks 1424 are attached to the spindle shaft 1422 in spaced apart relation. The disks 1424 rotate on spindle shaft 1422 which is power by a motor (not shown). Information is written on or read from the disks 1424 by heads or magnetic transducers (not shown) which are within sliders 1426. Preferably, sliders in accordance with the invention are attached to the suspensions or load springs 1428 causing the heads to fly high in textured zones and lower in the data zones. The load springs 1428 are attached to separate arms 1430 on an E block or comb 1432. The E block or comb 1432 is attached at one end of an actuator arm assembly 1436. The actuator arm assembly 1436 is rotatably attached within the housing 1412 on an actuator shaft 1438. However, the invention is not meant to be limited to the disk drive described above. Those skilled in the art will recognize that air bearing sliders with angled features according to the invention are useful with all configurations of disk drives or direct access storage devices (DASD).

In summary, the above described embodiments illustrate air bearing sliders having fly height profiles that are lower in an outer, smooth data zone than in an inner, textured zone thereby improving areal density and file capacity for disk files.

The foregoing description of the preferred and alternative embodiments of the invention have been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto.

What is claimed is:

1. An air bearing slider for supporting a transducer over a moving recording medium having smooth data zones and at least one textured zone, comprising:
   a support structure having side edges, a leading and a trailing edge relative to the motion of the recording medium, and a longitudinal axis disposed along the length of the support structure from the leading edge to the trailing edge; and
   air bearing surfaces, disposed on the support structure facing the moving recording medium, having angled features relative to the longitudinal axis of the support structure, and the angled features having an orientation that changes with respect to a tangential direction of the recording medium as the slider is positioned relative to the recording medium, the angled features selected to create a first air pressure distribution for a first fly height at first predetermined radii of the recording medium and a second air pressure distribution for a second, lower fly height at second predetermined radii of the recording medium wherein the first predetermined radii is at a smaller distance from the center of the moving recording medium than said second predetermined radii.

2. The air bearing slider of claim 1 wherein the angled features cause the slider to fly high over the first predetermined radii as a result of the first air pressure distribution and to fly low over the second predetermined radii of the recording medium as a result of the second air pressure distribution.

3. The air bearing slider of claim 2 wherein the first predetermined radii are at inner radii and the second predetermined radii are at non-inner radii.

4. The air bearing slider of claim 1 wherein the first air pressure distribution creates a first air pressure for the first fly height and the second air pressure distribution creates a second, lower air pressure for the second, lower fly height.

5. The air bearing slider of claim 1 wherein the air bearing surfaces further comprise a pair of side rails, each side rail having a longitudinal axis and being disposed along the side edges of the support structure, wherein the axis of at least one of the side rails is skewed relative to the longitudinal axis of the support structure.

6. The air bearing slider of claim 5 wherein the axis of both side rails is skewed relative to the longitudinal axis of the support structure.

7. The air bearing slider of claim 6 wherein the air bearing surfaces further comprise a crossbar, disposed parallel and generally proximate to the leading edge, for connecting the pair of side rails, the pair of side rails and crossbar forming a generally U-shaped recessed area therebetween.

8. The air bearing slider of claim 7 wherein the crossbar is oblique to the longitudinal axis of the support structure.

9. The air bearing slider of claim 7 further comprising a central rail wherein the axis of the central rail is skewed relative to the longitudinal axis of the support structure.

10. The air bearing slider of claim 9 wherein each of the side rails further comprise a crossbar portion, the crossbar portions forming two narrow channels on either side of the central rail.

11. The air bearing slider of claim 10 wherein the side rails are shortened relative to the trailing edge of the support structure.

12. The air bearing slider of claim 11 wherein the central rail further comprises a broader portion proximate to the trailing edge for supporting a magnetic element.

13. The air bearing slider of claim 6 further comprising a central rail having a longitudinal axis disposed between the pair of side rails, the central rail further comprises a neck and a trailing end, the trailing end being broadened and extending to the trailing edge of the support structure at an angle relative to the longitudinal axis of the support structure, the broadened trailing edge providing a support for a magnetic element, the side rails being shortened relative to the trailing edge of the support structure.

14. The air bearing slider of claim 13 wherein the trailing end angles from the neck to project toward a side of the support structure wherein the broadened trailing end extends to the trailing edge of the support structure.

15. The air bearing slider of claim 5 wherein the air bearing surfaces further comprise a crossbar, disposed parallel and generally proximate to the leading edge, for connecting the pair of side rails, the pair of side rails and crossbar forming a generally U-shaped recessed area therebetween.

16. The air bearing slider of claim 15 wherein the crossbar is oblique to the longitudinal axis of the support structure.

17. The air bearing slider of claim 15 further comprising a central rail having a longitudinal axis, the central rail disposed between the pair of side rails, the central rail connecting with the crossbar to form two U-shaped recessed areas.

18. The air bearing slider of claim 17 wherein the axis of the central rail is skewed relative to the longitudinal axis of the support structure.

19. The air bearing slider of claim 18 wherein the central rail further comprises a broader portion proximate to the trailing edge for supporting a magnetic element.

20. The air bearing slider of claim 19 wherein the side rails are shortened relative to the trailing edge of the support structure.

21. The air bearing slider of claim 5 further comprising a central rail having a longitudinal axis disposed between the pair of side rails.

22. The air bearing slider of claim 21 wherein each of the side rails further comprise a crossbar portion, the crossbar portions forming two narrow channels on either side of the central rail.

23. The air bearing slider of claim 1 wherein the air bearing surfaces further comprise a pair of side rails, each side rail having a longitudinal axis and being disposed along the side edges of the support structure, wherein one of the side rails comprises a neck portion and a broadened trailing end portion, the neck portion being skewed relative to the longitudinal axis of the support structure, and the broadened trailing end portion extending proximately to the trailing edge and supporting a magnetic element.

24. The air bearing slider of claim 23 wherein the axis of both side rails is skewed relative to the longitudinal axis of the support structure.

25. The air bearing slider of claim 24 wherein the air bearing surfaces further comprise a crossbar for connecting the pair of side rails to create a negative pressure pocket between the pair of side rails and the crossbar.

26. The air bearing slider of claim 25 wherein the crossbar is oblique to the longitudinal axis of the support structure.

27. The air bearing slider of claim 24 wherein the air bearing surfaces further comprise a crossbar portion extending from a first of the side rails toward a second side rail, a channel being formed between the crossbar portion and the second side rail.

28. The air bearing slider of claim 1 wherein the air bearing surfaces further comprise a pair of side rails, a center rail and a longitudinal channel between the side rails and the center rail, each side rail comprising a crossrail extending along a first portion of the leading edge and first and second leg rails extending from the cross rail in the direction of the trailing edge to form a negative pressure pocket therebetween.

29. The air bearing slider of claim 1 wherein the air bearing surfaces further comprise a pair of side rails and a channel between therebetween, each side rail comprising a crossrail extending along a first portion of the leading edge and first and second leg rails extending from the cross rail in the direction of the trailing edge to form a negative pressure pocket therebetween, one of the second leg rails widening proximate to the trailing edge for supporting a magnetic element.

30. The air bearing slider of claim 1, wherein the angled features include at least two portions angled at different angles relative to the longitudinal axis of the support structure.

31. A system for storing and retrieving information, comprising:
   a magnetic disk;
   drive means, coupled to the disk, for rotating the disk;
   a recording surface, disposed on the magnetic disk, having a textured inner radii zone for starting and stopping a slider thereon and a non-textured zone for recording and reading data thereon, the recording surface dragging air as the disk rotates and creating an air flow in parallel with a tangential velocity of the disk rotation;
   an air bearing slider, proximate to the recording surface, the slider comprising:
      a support structure having a first and a second side, a leading edge and a trailing edge, wherein said leading and trailing edges are relative to the motion of the disk, the support structure further having a longitudinal axis disposed along the length of the support structure from the leading edge to the trailing edge; and
      air bearing surfaces, disposed on the support structure facing the disk, having angled features relative to the longitudinal axis of the support structure, the angled features selected to create a first air pressure distribution for a first fly height when the air bearing surfaces are over the textured zone of the disk and a second air pressure distribution for a second, lower fly height when the air bearing surfaces are over the non-textured zone of the disk.

32. The system of claim 31 wherein the angled features cause the slider to fly high over the textured zone as a result of the first air pressure distribution and to fly lower over the non-textured zone of the recording medium as a result of the second air pressure.

33. The system of claim 31 wherein the first air pressure distribution creates a first air pressure for the first fly height and the second air pressure distribution creates a second, lower air pressure for the second, lower fly height.

34. The system of claim 31 wherein the air bearing surfaces further comprise a pair of side rails, each side rail having a longitudinal axis and being disposed along the side edges of the support structure, wherein the axis of at least one of the side rails is skewed relative to the longitudinal axis of the support structure.

35. The system of claim 34 wherein the axis of both side rails is skewed relative to the longitudinal axis of the support structure.

36. The system of claim 35 wherein the air bearing surfaces further comprise a crossbar, disposed parallel and generally proximate to the leading edge, for connecting the pair of side rails, the first side rail, second side rail and crossbar forming a generally U-shaped recessed area therebetween.

37. The system of claim 36 wherein the crossbar is oblique to the longitudinal axis of the support structure.

38. The system of claim 37 further comprising a central rail wherein the axis of the central rail is skewed relative to the longitudinal axis of the support structure.

39. The system of claim 38 wherein each of the side rails further comprise a crossbar portion, the crossbar portions forming two narrow channels on either side of the central rail.

40. The system of claim 39 wherein the side rails are shortened relative to the trailing edge of the support structure.

41. The system of claim 40 wherein the central rail further comprises a broader portion proximate to the trailing edge for supporting a magnetic element.

42. The system of claim 34 further comprising a central rail having a longitudinal axis disposed between the pair of side rails, the central rail further comprises a neck and a trailing end, the trailing end being broadened and extending to the trailing edge of the support structure at an angle relative to the longitudinal axis of the support structure, the broadened trailing end providing a support for a magnetic element, the side rails being shortened relative to the trailing edge of the support structure.

43. The system of claim 42 wherein the trailing end angles from the neck to project toward a side of the support structure wherein the broadened trailing end extends to the trailing edge of the support structure.

44. The system of claim 34 wherein the air bearing surfaces further comprise a crossbar, disposed parallel and generally proximate to the leading edge, for connecting the pair of side rails, the pair of side rails and crossbar forming a generally U-shaped recessed area therebetween.

45. The system of claim 44 wherein the crossbar is oblique to the longitudinal axis of the support structure.

46. The system of claim 44 further comprising a central rail having a longitudinal axis, the central rail disposed between the pair of side rails, the central rail connecting with the crossbar to form two U-shaped recessed areas.

47. The system of claim 46 wherein the axis of the central rail is skewed relative to the longitudinal axis of the support structure.

48. The system of claim 47 wherein the central rail further comprises a broader portion proximate to the trailing edge for supporting a magnetic element.

49. The system of claim 48 wherein the side rails are shortened relative to the trailing edge of the support structure.

50. The system of claim 34 further comprising a central rail having a longitudinal axis disposed between the pair side rails.

51. The system of claim 50 wherein each of the side rails further comprise a crossbar portion, the crossbar portions forming two narrow channels on either side of the central rail.

52. The system of claim 31 wherein the air bearing surfaces further comprise a pair of side rails, each side rail having a longitudinal axis and being disposed along the side edges of the support structure, wherein one of the side rails comprises a neck portion and a broadened trailing end portion, the neck portion being skewed relative to the longitudinal axis of the support structure, and the broadened trailing end portion extending proximately to the trailing edge and supporting a magnetic element.

53. The system of claim 52 wherein the axis of both side rails is skewed relative to the longitudinal axis of the support structure.

54. The system of claim 53 wherein the air bearing surfaces further comprise a crossbar for connecting the pair of side rails to create a negative pressure pocket between the pair of side rails and the crossbar.

55. The system of claim 54 wherein the crossbar is oblique to the longitudinal axis of the support structure.

56. The system of claim 53 wherein the air bearing surfaces further comprise a crossbar portion extending from a first of the side rails toward a second side rail, a channel being formed between the crossbar portion and the second side rail.

57. The system of claim 31 wherein the air bearing surfaces further comprise a pair of side rails, a center rail and a longitudinal channel between the side rails and the center rail, each side rail comprising a crossrail extending along a first portion of the leading edge and first and second leg rails extending from the cross rail in the direction of the trailing edge to form a negative pressure pocket therebetween.

58. The system of claim 31 wherein the air bearing surfaces further comprise a pair of side rails and a channel between therebetween, each side rail comprising a crossrail extending along a first portion of the leading edge and first and second leg rails extending from the cross rail in the direction of the trailing edge to form a negative pressure pocket therebetween, one of the second leg rails widening proximate to the trailing edge for supporting a magnetic element.

59. The system of claim 31, wherein the angled features include at least two portions angled at different angles relative to the longitudinal axis of the support structure.

60. A disk drive apparatus for recording data, comprising:
at least one rotating disk for recording data thereon, the disk further comprising a textured inner radii zone and a non-textured zone;
a housing, the rotatable disk being rotatably attached to the housing;
an actuator arm assembly, coupled to the housing;
a slider, attached to the actuator arm assembly proximate to the recording surface such that the slider can be selectively positioned over the surface of the rotating disk, the slider further comprising:
a support structure having a first and a second side, a leading edge and a trailing edge, wherein said leading and trailing edges are relative to the motion of the disk, the support structure further having a longitudinal axis disposed along the length of the support structure from the leading edge to the trailing edge; and
air bearing surfaces, disposed on the support structure facing the disk, having angled features relative to the longitudinal axis of the support structure, the angled features selected to create a first air pressure for a first fly height when the air bearing surfaces are over the textured zone of the disk and a second, lower air pressure for a second, lower fly height when the air bearing surfaces are over the non-textured zone of the disk.

61. The apparatus of claim 60 wherein the angled features cause the slider to fly high over the textured zone as a result of the first air pressure and to fly low over the non-textured zone of the rotating disk as a result of the second, lower air pressure.

62. The system of claim 60 wherein the air bearing surfaces further comprise a pair of side rails, each side rail having a longitudinal axis and being disposed along the side edges of the support structure, wherein the axis of at least one of the side rails is skewed relative to the longitudinal axis of the support structure.

63. The system of claim 62 wherein the axis of both side rails is skewed relative to the longitudinal axis of the support structure.

64. The apparatus system of claim 63 wherein the air bearing surfaces further comprise a crossbar, disposed parallel and generally proximate to the leading edge, for connecting the first and second side rails, the pair of side rails and crossbar forming a generally U-shaped recessed area therebetween.

65. The apparatus of claim 64 wherein the crossbar is oblique to the longitudinal axis of the support structure.

66. The apparatus of claim 64 comprising a central rail wherein the axis of the central rail is skewed relative to the longitudinal axis of the support structure.

67. The apparatus of claim 66 wherein each of the side rails further comprise a crossbar portion, the crossbar portions forming two narrow channels on either side of the central rail.

68. The apparatus of claim 67 wherein the side rails are shortened relative to the trailing edge of the support structure.

69. The apparatus of claim 68 wherein the central rail further comprises a broader portion proximate to the trailing edge for supporting a magnetic element.

70. The apparatus of claim 63 further comprising a central rail having a longitudinal axis disposed between the pair of side rails, the central rail further comprises a neck and a trailing end, the trailing end being broadened and extending to the trailing edge of the support structure at an angle relative to the longitudinal axis of the support structure, the broadened trailing end providing a support for a magnetic element, the side rails being shortened relative to the trailing edge of the support structure.

71. The apparatus of claim 70 wherein the trailing end angles sharply from the neck to project toward a side of the support structure wherein the broadened trailing end extends to the trailing edge of the support structure.

72. The system of claim 62 wherein the air bearing surfaces further comprise a crossbar, disposed parallel and generally proximate to the leading edge, for connecting the pair of side rails, the pair of side rails and crossbar forming a generally U-shaped recessed area therebetween.

73. The system of claim 72 wherein the crossbar is oblique to the longitudinal axis of the support structure.

74. The apparatus of claim 72 further comprising a central rail having a longitudinal axis, the central rail disposed between the pair of side rails, the central rail connecting with the crossbar to form two U-shaped recessed areas.

75. The apparatus of claim 74 wherein the axis of the central rail is skewed relative to the longitudinal axis of the support structure.

76. The apparatus of claim 75 wherein the central rail further comprises a broader portion proximate to the trailing end for supporting a magnetic element.

77. The apparatus of claim 76 wherein the side rails are shortened relative to the trailing edge of the support structure.

78. The apparatus of claim 62 further comprising a central rail having a longitudinal axis disposed between the second and first side rails.

79. The apparatus of claim 78 wherein each of the side rails further comprise a crossbar portion, the crossbar portions forming two narrow channels on either side of the central rail.

80. The apparatus of claim 60 wherein the air bearing surfaces further comprise a pair of side rails, each side rail having a longitudinal axis and being disposed along the side edges of the support structure, wherein one of the side rails comprises a neck portion and a broadened trailing end portion, the neck portion being substantially skewed relative to the longitudinal axis of the support structure, and the broadened trailing end portion extending proximately to the trailing edge and supporting a magnetic element.

81. The apparatus of claim 80 wherein the axis of both side rails is skewed relative to the longitudinal axis of the support structure.

82. The apparatus of claim 81 wherein the air bearing surfaces further comprise a crossbar for connecting the pair of side rails to create a negative pressure pocket between the pair of side rails and the crossbar.

83. The apparatus of claim 82 wherein the crossbar is oblique to the longitudinal axis of the support structure.

84. The apparatus of claim 81 wherein the air bearing surfaces further comprise a crossbar portion extending from a first of the side rails toward a second side rail, a channel being formed between the crossbar portion and the second side rail.

85. The apparatus of claim 60 wherein the air bearing surfaces further comprise a pair of side rails, a center rail and a longitudinal channel between the side rails and the center rail, each side rail comprising a crossrail extending along a first portion of the leading edge and first and second leg rails extending from the cross rail in the direction of the trailing edge to form a negative pressure pocket therebetween.

86. The apparatus of claim 60 wherein the air bearing surfaces further comprise a pair of side rails and a channel between therebetween, each side rail comprising a crossrail extending along a first portion of the leading edge and first and second leg rails extending from the cross rail in the direction of the trailing edge to form a negative pressure pocket therebetween, one of the second leg rails widening proximate to the trailing edge for supporting a magnetic element.

87. The apparatus of claim 60, wherein the angled features include at least two portions angled at different angles relative to the longitudinal axis of the support structure.

88. A method for making an air bearing slider for supporting a transducer over a moving recording medium having smooth data zones and at least one textured zone, comprising the steps of:

forming a support structure having side edges, a leading and a trailing edge relative to the motion of the recording medium, and a longitudinal axis disposed along the length of the support structure from the leading edge to the trailing edge; and forming air bearing surfaces on the support structure facing the moving recording medium, the air bearing surfaces having angled features relative to the longitudinal axis of the support structure, and the angled features having an orientation that changes with respect to a tangential direction of the recording medium as the slider is positioned relative to the recording medium, the angled features creating a first air pressure distribution for a first fly height at first predetermined radii of the recording medium and a second air pressure distribution for a second lower fly height at second predetermined radii of the recording medium, wherein the first predetermined radii is at a smaller distance from the center of the moving recording medium than said second predetermined radii.

89. The method of claim 88 wherein the step of forming air bearing surfaces further comprises the step of forming a pair of side rails, each side rail having a longitudinal axis and being disposed along the side edges of the support structure, wherein the axis of at least one of the side rails is skewed relative to the longitudinal axis of the support structure.

90. The method of claim 89 further comprising the step of skewing the axis of both side rails relative to the longitudinal axis of the support structure.

91. The method of claim 90 wherein the step of forming air bearing surfaces further comprises forming a crossbar parallel and generally proximate to the leading edge for connecting the pair of side rails, the pair of side rails and crossbar forming a generally U-shaped recessed area therebetween.

92. The method of claim 91 wherein the step of forming the crossbar further comprises the step of making the crossbar oblique to the longitudinal axis of the support structure.

93. The method of claim 91 wherein the step of forming the side rails further comprises the step of skewing the axis of the side rails relative to the longitudinal axis of the support structure.

94. The method of claim 93 wherein the step of forming the side rails further comprises the step of forming a crossbar portion, the crossbar portions forming two narrow channels on either side of a central rail.

95. The method of claim 94 wherein the step of forming the side rails further comprises the step of shortening the side rails relative to the trailing edge of the support structure.

96. The method of claim 95 wherein the step of forming the central rail further comprises the step of forming a broader portion proximate to the trailing edge for supporting a magnetic element.

97. The method of claim 90 further comprising the step of forming a central rail having a longitudinal axis, the central rail being formed between the pair of side rails, the step of forming the central rail further comprises the step of forming a neck and a trailing end, the trailing end being broadened and extending to the trailing edge of the support structure at an angle relative to the longitudinal axis of the support structure, the broadened trailing end providing a support for a magnetic element, the side rails being shortened relative to the trailing edge of the support structure.

98. The method of claim 97 wherein the step of forming the trailing end further comprises the step of angling the trailing end from the neck to project toward a side of the support structure wherein the broadened trailing end extends to the trailing edge of the support structure.

99. The method of claim 89 wherein the step of forming air bearing surfaces further comprises the step of forming a crossbar parallel and generally proximate to the leading edge, for connecting the pair of side rails, the pair of side rails and crossbar forming a generally U-shaped recessed area therebetween.

100. The method of claim 99 wherein the step of forming the crossbar further comprises the step of making the crossbar oblique to the longitudinal axis of the support structure.

101. The method of claim 99 further comprising the step of forming a central rail having a longitudinal axis, the central rail being formed between the pair of side rails and connecting with the crossbar to form two recessed areas.

102. The method of claim 101 wherein the step of forming the central rail further comprises the step of skewing the axis of the central rail relative to the longitudinal axis of the support structure.

103. The method of claim 102 wherein the step of forming the central rail further comprises the step of forming a broader portion proximate to the trailing edge for supporting a magnetic element.

104. The method of claim 103 wherein the step of forming the side rails further comprises the step of shortening the side rails relative to the trailing edge of the support structure.

105. The method of claim 89 wherein the step of forming air bearing surfaces further comprises the step of forming a central rail having a longitudinal axis disposed between the pair of side rails.

106. The method of claim 105 wherein the step of forming side rails further comprises the step of forming a crossbar portion, the crossbar portions forming two narrow channels on either side of the central rail.

107. The method of claim 88 wherein the angled features are formed to cause the slider to fly high over the first predetermined radii as a result of the first air pressure distribution and to fly low over the second predetermined radii of the recording medium as a result of the second air pressure distribution.

108. The method of claim 107 wherein the first predetermined radii are at inner radii and the second predetermined radii are at non-inner radii.

109. The method of claim 88 wherein the step of forming air bearing surfaces further comprises the step of forming a pair of side rails, each side rail having a longitudinal axis and being disposed along the side edges of the support structure, wherein the step of forming one of the side rails comprises the step of forming a neck portion and a broadened trailing end portion, the neck portion skewed relative to the longitudinal axis of the support structure, and the broadened trailing end portion extending proximately to the trailing edge and supporting a magnetic element.

110. The method of claim 109 wherein the step of forming the side rails further comprises the step of skewing the axis of the side rails relative to the longitudinal axis of the support structure.

111. The method of claim 110 wherein the step of forming air bearing surfaces further comprises the step of forming a crossbar connecting the pair of side rails to create a negative pressure pocket between the pair of side rails and the crossbar.

112. The method of claim 111 wherein the step of forming the crossbar further comprises the step of making the crossbar oblique to the longitudinal axis of the support structure.

113. The method of claim 110 wherein the step of forming air bearing surfaces further comprises the step of forming a crossbar portion extending from a first of the side rails toward a second side rail, a channel being formed between the crossbar portion and the second side rail.

114. The method of claim 88 wherein the step of forming air bearing surfaces further comprises the step of forming a pair of side rails, a center rail and a longitudinal channel between the side rails and the center rail, each side rail comprising a crossrail extending along a first portion of the leading edge and first and second leg rails extending from the cross rail in the direction of the trailing edge to form a negative pressure pocket therebetween.

115. The method of claim 88 wherein the step of forming air bearing surfaces further comprises the step of forming a pair of side rails and a channel therebetween, each side rail comprising a crossrail extending along a first portion of the leading edge and first and second leg rails extending from the cross rail in the direction of the trailing edge to form a negative pressure pocket therebetween, one of the second leg rails widening proximate to the trailing edge for supporting a magnetic element.

116. The method of claim 88, wherein the angled features include at least two portions angled at different angles relative to the longitudinal axis of the support structure.

117. An actuator assembly for use with a rotatable recording medium having at least one smooth data zone and at least one textured zone, comprising:
an actuator arm;
an air bearing slider rotatably mounted on the actuator arm, the slider including:
a support structure having side edges, a leading and a trailing edge relative to the motion of the recording medium, and a longitudinal axis disposed along the length of the support structure from the leading edge to the trailing edge; and
an air bearing surface disposed on the support structure facing the rotatable recording medium and having angled features relative to the longitudinal axis of the support structure;
wherein the slider is mounted on the actuator arm such that the angled features have alignments, with respect to the tangential direction of the recording medium, which differ between the textured zone and the smooth data zone so as to cause the slider to fly higher over the textured zone than the smooth data zone.

118. The actuator assembly of claim 117, wherein the alignments include a first alignment when the angled features are over the smooth zone and second alignment when the angled features are over the textured zone, the first alignment being more parallel with the tangential direction of the recording medium than the second alignment, thereby creating a higher pressure distribution and a higher fly height in the textured zone than the smooth zone.

119. A system for storing and retrieving information, comprising:
- a magnetic disk having at least one textured zone for starting and stopping a slider thereon and at least one smooth zone for recording and reading data thereon;
- drive means, coupled to the disk, for rotating the disk;
- an actuator arm;
- an air bearing slider mounted on the actuator arm, the slider including:
  - a support structure having a first and a second side, a leading edge and a trailing edge, wherein said leading and trailing edges are relative to the motion of the disk, the support structure further having a longitudinal axis disposed along the length of the support structure from the leading edge to the trailing edge; and
  - an air bearing surface, disposed on the support structure facing the disk, having angled features relative to the longitudinal axis of the support structure;
  - wherein the slider is mounted on the actuator arm such that the angled features have alignments, with respect to the tangential direction of the disk, which differ between the textured zone and the smooth zone so as to cause the slider to fly higher over the textured zone than the smooth zone.

120. The system of claim 119, wherein the alignments include a first alignment when the angled features are over the smooth zone and second alignment when the angled features are over the textured zone, the first alignment being more parallel with the tangential direction of the disk than the second alignment, thereby creating a higher pressure distribution and a higher fly height in the textured zone than the smooth zone.

121. The system of claim 119, wherein the at least one textured zone is closer to an inner radius of the disk than the at least one smoother zone.

122. A disk drive apparatus for recording data, comprising:
- at least one rotating disk for recording data thereon, the disk including at least one textured zone and at least one non-textured zone;
- a housing, the rotatable disk being rotatably attached to the housing;
- an actuator arm assembly, coupled to the housing;
- a slider, attached to the actuator arm assembly proximate the rotating disk such that the slider can be selectively positioned over the rotating disk, the slider including:
  - a support structure having a first and a second side, a leading edge and a trailing edge, wherein said leading and trailing edges are relative to the motion of the disk, the support structure further having a longitudinal axis disposed along the length of the support structure from the leading edge to the trailing edge; and
  - an air bearing surface disposed on the support structure facing the rotating disk and having angled features relative to the longitudinal axis of the support structure;
  - wherein the slider is mounted on the actuator arm assembly such that the angled features have alignments, with respect to the tangential direction of the disk, which differ between the textured zone and the non-textured zone so as to cause the slider to fly higher over the textured zone than the non-textured zone.

123. The apparatus of claim 122, wherein the alignments include a first alignment when the angled features are over the non-textured zone and second alignment when the angled features are over the textured zone, the first alignment being more parallel with the tangential direction of the rotating disk than the second alignment, thereby creating a higher pressure distribution and a higher fly height at the textured zone than the non-textured zone.

124. The apparatus of claim 122, wherein the at least one textured zone is closer to an inner radius of the rotating disk than the at least one non-textured zone.

* * * * *

UNITED STATES PATENT AND TRADEMARK OFFICE
CERTIFICATE OF CORRECTION

PATENT NO.   : 5,870,250
DATED        : February 9, 1999
INVENTOR(S)  : Bolasna et al.

Page 1 of 2

It is certified that error appears in the above-identified patent and that said Letters Patent is hereby corrected as shown below:

References Cited,
Below references should be listed.

| | | |
|---|---|---|
| 4-205886  | 07/28/92 | Japan |
| 4-209311  | 07/30/92 | Japan |
| 4-355292  | 12/09/92 | Japan |
| 54-66818  | 05/29/79 | Japan |
| 6-223525  | 08/12/94 | Japan |
| 60-47278  | 03/14/85 | Japan |
| 62-164204 | 07/20/87 | Japan |
| 63-244453 | 10/11/88 | Japan |

Title page,
Inventor section, change "Sunnydale" to -- Sunnyvale --

Column 14,
Line 53, change "claim 34" to -- claim 35 --

Column 16,
Line 33, change "system" to -- apparatus --
Line 39, change "system" to -- apparatus --
Line 42, delete "system"
Line 45, change "the first and second side rails" to -- pair of --

Column 17,
Line 30-31, change "second and first" to -- pair of --
Line 25, change "end" to -- edge --

References Cited,
Below references should be listed.

| | | |
|---|---|---|
| 4,757,402 | 07/12/88 | Mo |
| 4,819,100 | 04/04/89 | Asano |
| 4,896,233 | 01/23/90 | Yamada |
| 4,926,275 | 05/5/90  | Kano et al. |
| 4,984,114 | 01/08/91 | Takeuchi et al. |

UNITED STATES PATENT AND TRADEMARK OFFICE
CERTIFICATE OF CORRECTION

PATENT NO.   : 5,870,250
DATED        : February 9, 1999
INVENTOR(S)  : Bolasna et al.

It is certified that error appears in the above-identified patent and that said Letters Patent is hereby corrected as shown below:

| | | |
|---|---|---|
| 5,014,146 | 05/07/91 | Takatsuka et al. |
| 5,062,017 | 10/29/91 | Strom et al. |
| 5,097,370 | 03/17/92 | Hsia |
| 5,196,974 | 03/23/93 | Higashiya et al. |
| 5,212,608 | 05/18/93 | Yoneoka |
| 5,430,591 | 07/04/95 | Takeuchi et al. |
| 2-260182 | 10/22/90 | Japan |
| 3-76070 | 04/02/91 | Japan |
| 3-104071 | 05/01/91 | Japan |
| 3-283150 | 12/13/91 | Japan |

Signed and Sealed this

Eighth Day of January, 2002

Attest:

JAMES E. ROGAN
Attesting Officer    Director of the United States Patent and Trademark Office